United States Patent
Bolkhovitin et al.

(10) Patent No.: US 11,054,991 B2
(45) Date of Patent: Jul. 6, 2021

(54) DATA STORAGE SYSTEM SCALE-OUT WITH LOCAL ADDRESS REMAPPING

(71) Applicant: Western Digital Technologies, Inc., San Jose, CA (US)

(72) Inventors: Vladislav Bolkhovitin, San Jose, CA (US); Sanjay Subbarao, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 266 days.

(21) Appl. No.: 15/938,359

(22) Filed: Mar. 28, 2018

(65) Prior Publication Data

US 2019/0294339 A1    Sep. 26, 2019

Related U.S. Application Data

(60) Provisional application No. 62/646,308, filed on Mar. 21, 2018.

(51) Int. Cl.
*G06F 3/06* (2006.01)
*G06F 12/1072* (2016.01)

(52) U.S. Cl.
CPC ............ *G06F 3/0607* (2013.01); *G06F 3/067* (2013.01); *G06F 3/0647* (2013.01);
(Continued)

(58) Field of Classification Search
None
See application file for complete search history.

(56) References Cited

U.S. PATENT DOCUMENTS 5,615,352 A * 3/1997 Jacobson .............. G06F 3/0601
711/114
6,008,987 A 12/1999 Gale et al.
(Continued)

FOREIGN PATENT DOCUMENTS

DE    102005063281    7/2007
EP    2066158    6/2009
(Continued)

OTHER PUBLICATIONS

International Search Report and Written Opinion dated Nov. 22, 2017 received in International Patent Application No. PCT/US2017/050194, which corresponds to U.S. Appl. No. 15/491,915, 14 pages (Van Assche).
(Continued)

*Primary Examiner* — Edward J Dudek, Jr.
*Assistant Examiner* — Ralph A Verderamo, III
(74) *Attorney, Agent, or Firm* — Morgan, Lewis & Bockius, LLP

(57) ABSTRACT

A system and method improve the performance of non-volatile memory storage by automatically, when one or more data storage devices are added to a first set of storage devices in a storage system, resulting in a second set of storage devices, remapping data stored in the first set of storage devices so as to redistribute data across the second set of storage devices while minimizing the amount of data moved to the newly added storage devices. In addition, the remapping and redistribution of data results in empty logical address regions in data storage devices from which data is copied, and a logical address compaction operation is used to remap one or more logical address ranges so as to eliminate the empty logical address regions, without moving data corresponding to the remapped logical address ranges.

19 Claims, 16 Drawing Sheets

(52) U.S. Cl.
CPC ........ *G06F 3/0658* (2013.01); *G06F 12/1072* (2013.01); *G06F 2212/1048* (2013.01); *G06F 2212/154* (2013.01); *G06F 2212/2022* (2013.01); *G06F 2212/254* (2013.01)

(56) References Cited

U.S. PATENT DOCUMENTS

| | | | | |
|---|---|---|---|---|
| 6,611,907 | B1* | 8/2003 | Maeda | G06F 3/0613 |
| | | | | 711/103 |
| 9,626,246 | B1* | 4/2017 | Parkhurst | G06F 3/0619 |
| 2006/0129785 | A1* | 6/2006 | Ripberger | G06F 3/0689 |
| | | | | 711/173 |
| 2008/0236791 | A1 | 10/2008 | Wayman | |
| 2012/0124312 | A1 | 5/2012 | Vemuri et al. | |
| 2012/0170224 | A1 | 7/2012 | Fowler et al. | |
| 2013/0151802 | A1* | 6/2013 | Bahadure | G06F 3/0605 |
| | | | | 711/162 |
| 2015/0067245 | A1* | 3/2015 | Kruger | G06F 3/0634 |
| | | | | 711/103 |
| 2016/0110270 | A1 | 4/2016 | Iwashita | |
| 2016/0179637 | A1 | 6/2016 | Winokur | |
| 2016/0217049 | A1 | 7/2016 | Bali et al. | |

FOREIGN PATENT DOCUMENTS

| | | |
|---|---|---|
| EP | 2395827 | 12/2011 |
| FR | 2560731 | 9/1985 |
| JP | H066064 | 1/1994 |

OTHER PUBLICATIONS

International Search Report and International Written Opinion of International Patent Application PCT/US2015/016656, dated May 18, 2015, 13 pages.

\* cited by examiner

600

At a controller system having one or more processors and a communications interface for communicatively coupling the controller system to storage devices in the storage system for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in the first plurality of storage devices to a respective storage device in the first plurality of storage devices and to a respective sub-segment offset in a local logical address space ⎯602

> 604 The controller system comprises a host system external to the first plurality of storage devices and the second plurality of storage devices, the host system having a device mapper driver module for determining the first data layout and second data layout and for initiating or controlling performance of sub-segment copying and logical address compaction operations In response to adding one or more storage devices to the first plurality of storage devices, thereby forming a second plurality of storage devices ⎯606

DATA STORAGE SYSTEM SCALE-OUT WITH LOCAL ADDRESS REMAPPING

RELATED APPLICATIONS

This application claims priority to U.S. Provisional Patent Application No. 62/646,308, filed Mar. 21, 2018, which is hereby incorporated by reference in its entirety.

TECHNICAL FIELD

The disclosed embodiments relate generally to memory systems, and in particular, to systems and processes for adding data storage devices (e.g., solid state drives) to a data storage system, sometimes called scale-out data storage systems or network attached data storage systems.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Any storage node has limitations, in terms of both performance and capacity, with respect to how much data storage can be implemented at the node. This is especially important for network disaggregated data storage, where a significant number of storage nodes can be added to the network. Hence, in many use cases, it is necessary to grow capacity and performance available to a host or a set of hosts by adding more storage nodes (storage scale out), instead of adding more data storage to existing nodes. However, existing scale out solutions involve very heavy overhead.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable higher throughput in storage to memory devices.

The disclosed system and method provide an efficient way to scale out storage capacity and performance by use of direct block placement algorithms and logical address compaction to optimize capacity balancing after one or more data storage devices are added to a storage system that previously had a first plurality of data storage devices. A controller system (e.g., a main controller, or a driver in a host system) having one or more processors and a communications interface for communicatively coupling the controller system to data storage devices in the storage system, performs a sequence of operations. The sequence of operations includes: in response to adding a set of one or more storage devices to the first plurality of data storage devices, thereby forming a second plurality of data storage devices, for a global logical address space divided into a first plurality of segments, each segment further divided into a first plurality of sub-segments, wherein, in accordance with a first data layout, each sub-segment of each segment in the first plurality of segments for which data is stored, or is to be stored, in the first plurality of data storage devices is mapped to a respective storage device in the first plurality of data storage devices and to a respective sub-segment offset in a local logical address space in the respective storage device: (1) determining for one or more segments in the first plurality of segments, a subset of that segment's sub-segments, the subset comprising sub-segments that are to be copied; (2) copying each respective sub-segment in the determined subset from a source storage device to which the respective segment is mapped by the first data layout to a destination storage device to which the respective sub-segment is mapped by a second data layout, wherein the destination storage device is in the set of one or more added storage devices; (3) in the source storage device to which the respective segment is mapped by the first data layout, adding a local logical address range for the respective sub-segment to a free list for the source storage device; and (4) in the source storage device, performing a logical address compaction operation by remapping one or more local logical address ranges, corresponding to one or more sub-segments in the global logical address space mapped to the source storage device by the second data layout, to logical address ranges in the free list for the source storage device, without moving data corresponding to the remapped one or more logical address ranges.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIGS. 6A-6H illustrate a flowchart representation of a method of scale out transformation after adding storage nodes, in accordance with some embodiments.

Figure 1A:
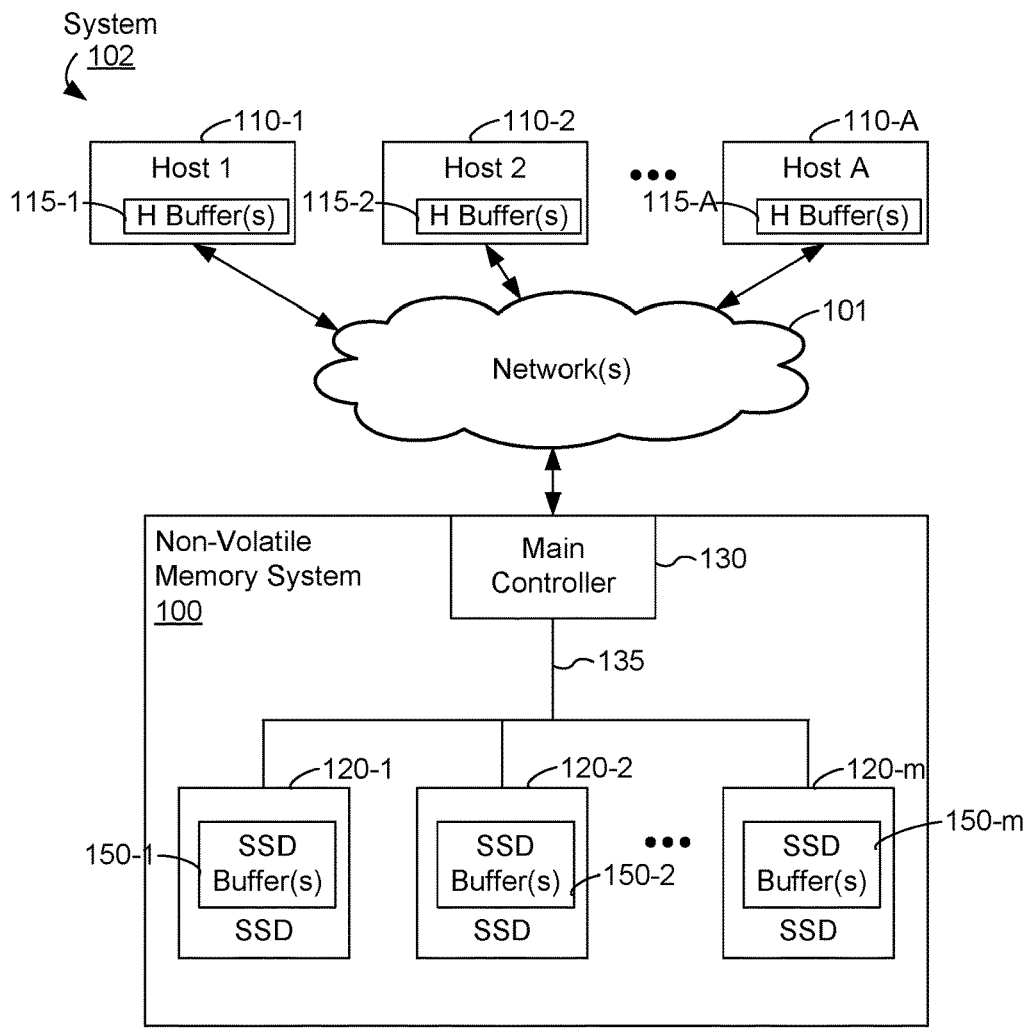
FIG. 1A is a block diagram illustrating a distributed computing system that includes an implementation of a non-volatile memory system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to increase the amount of data storage in a data storage system, sometimes called a scale-out data storage system or network attached data storage system, while minimizing, or limiting, the amount of data that is copied of physically moved as a result of adding one or more data storage devices to the data storage system. Typically, each data storage device in the data storage system includes non-volatile memory, typically implemented as a plurality of non-volatile memory devices, such as flash memory chips; and a controller for managing data access operations (e.g., reading, writing, erasing and/or invalidating, etc.) that access data in the data storage device's non-volatile memory. The controller typically includes hardware and/or software for translating logical addresses in data access commands received by the data storage device into physical addresses or physical memory locations at which data is stored within the data storage device's non-volatile memory.

(A1) More specifically, some embodiments include a method of managing a data storage system having a first plurality of data storage devices. The method comprises, at a controller system (e.g., a main controller, or a driver in a host system) having one or more processors and a communications interface for communicatively coupling the controller system to data storage devices in the data storage system, performing a sequence of operations. The sequence of operations includes: for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in a first plurality of data storage devices to a respective data storage device in the first plurality of data storage devices and to a respective sub-segment offset in a local logical address space in the respective data storage device. In some embodiments, the segments have a fixed segment size, the sub-segments have a fixed sub-segment size, and the blocks have a fixed block size. The sequence of operations further includes: in response to adding one or more data storage devices to the first plurality of data storage devices, thereby forming a second plurality of data storage devices, performing a first set of operations. The first set of operations includes: determining a second data layout that maps each sub-segment of each segment in a second plurality of segments for which data is stored, or is to be stored, in the second plurality of data storage devices to a respective data storage device in the second plurality of data storage devices and to a respective sub-segment offset in a local logical address space in the respective data storage device, wherein the second plurality of segments includes the first plurality of segments and additional segments.

The first set of operations further includes, for one or more respective segments in the first plurality of segments, repeating a second set of operations. The second set of operations includes: for one or more respective sub-segments in the respective segment for which the second data layout maps the respective segment to a different data storage device than the data storage device to which the respective segment is mapped by the first data layout: copying the respective sub-segment from a source data storage device to which the respective segment is mapped by the first data layout to a destination data storage device to which the respective sub-segment is mapped by the second data layout. The second set of operations further includes, in the source data storage device to which the respective segment is mapped by the first data layout, adding the local logical address range for the respective sub-segment to a free list for the source data storage device. The first set of operations additionally includes, in a source data storage device, for which at least one respective sub-segment has been copied to a respective destination data storage device, performing a logical address compaction operation by remapping one or more local logical address ranges to logical address ranges in the free list for the source storage device, without moving data corresponding to the remapped one or more logical address ranges.

(A2) In some embodiments of the method of A1, remapping the one or more local logical address ranges comprises, in the source data storage device, remapping the one or more local logical address ranges for one or more sub-segments in a segment other than the respective segment to logical address ranges in the free list for the source storage device.

(A3) In some embodiments of the method of any of A1-A2, copying the respective sub-segment from a source data storage device to which the respective segment is mapped by the first data layout to a destination data storage device to which the respective segment is mapped by the second data layout includes: calculating a segment offset of a destination segment based on a source logical block address, the number of blocks in a segment; calculating a first sub-segment offset in the destination segment based on the offset of the destination segment, the number of blocks in a segment, and the number of blocks in a sub-segment; using the second data layout, determining the destination data storage device and a second sub-segment offset in the destination segment based on the first sub-segment offset; and copying the respective sub-segment from the source data storage device to data storage portions of the destination data storage device corresponding to the second sub-segment offset.

(A4) In some embodiments of the method of A3, copying the respective sub-segment from the source data storage device to data storage portions of the destination data storage device corresponding to the second sub-segment offset includes, for a respective block in the respect sub-segment: calculating a block offset for the respective block in the respective sub-segment based on a source logical block address for the respective block, the number of blocks in a segment, and the number of blocks in a sub-segment; calculating a destination logical block address for the respective block based on the block offset of the respective block in the respective sub-segment, the segment offset, the second sub-segment offset, the number of blocks in a segment, and the number of blocks in a sub-segment; and copying the respective block from the source data storage device to data storage portions of the destination data storage device identified by the destination logical block address for the respective block.

(A5) In some embodiments of the method of any of A1-A4, the second data layout is implemented using a table that maps each respective sub-segment in a source segment in the plurality of segments to a data storage device and a sub-segment offset in a destination segment.

(A6) In some embodiments of the method of any of A1-A5, the method includes mapping a source logical address specified by a host command to a destination device and local logical address in a logical address space of the destination device, and the mapping includes: in accordance with the second data layout and the source logical address, determining a destination segment and destination sub-segment corresponding to the specified logical address; determining a segment offset corresponding to the destination segment; determining a sub-segment offset corresponding to a relative position of the destination sub-segment within a portion of the destination segment corresponding to the destination device; determining a least significant portion of the source logical address in accordance with a value of the source logical address modulo the fixed sub-segment size; and mapping the source logical address to the local logical address in the logical address space of the destination device in accordance with the segment offset, the sub-segment offset and the least significant portion of the source logical address.

(A7) In some embodiments of the method of any of A1-A2, determining if the number of sub-segments in each respective segment in the second plurality of segments cannot be evenly divided amongst the second plurality of data storage devices; in accordance with the determination that the number of sub-segments in each respective segment in the second plurality of segments cannot be evenly divided amongst the second plurality of data storage devices: determining a super-segment size, corresponding to a number of segments, NS, to be included in each super-segment of a plurality of super-segments for which data is stored, or is to be stored, in the second plurality of data storage devices, such that the number of sub-segments, NSS, in each respective super-segment in the plurality of super-segments can be evenly divided amongst the second plurality of data storage devices; and determining the second data layout so as to map each sub-segment in the each super-segment in the plurality of super-segments to a respective data storage device in the second plurality of data storage devices and to a respective sub-segment offset in a local logical address space in the respective data storage device. In some embodiments, the super-segments have a fixed size equal to NS multiplied by the fixed segment size.

(A8) In some embodiments of the method of A7, the method includes mapping a source logical address specified by a host command to a destination device and local logical address in a logical address space of the destination device, and the mapping includes: in accordance with the second data layout and the source logical address, determining a destination super-segment, in the plurality of super-segments, and destination sub-segment corresponding to the specified logical address; determining a super-segment offset corresponding to the destination super-segment; determining a sub-segment offset corresponding to a relative position of the destination sub-segment within a portion of the destination super-segment corresponding to the destination device; determining a least significant portion of the source logical address in accordance with a value of the source logical address modulo the fixed sub-segment size; and mapping the source logical address to the local logical address in the logical address space of the destination device in accordance with the super-segment offset, the sub-segment offset and the least significant portion of the source logical address.

(A9) In some embodiments of the method of A8, the source logical address is a logical block address in the address space of the host, and determining the least significant portion of the source logical address comprises determining a first value corresponding to the source logical address modulo the fixed sub-segment size, and determining a block offset corresponding to an integer portion of a second value determined by dividing the first value by the fixed block size. In some embodiments, the local logical block address is further mapped, by the destination data storage device, into a physical address in the destination device using a logical-to-physical mapping of the destination data storage device.

(A10) In some embodiments of the method of any of A1-A9, the controller system comprises a host system external to the first plurality of data storage devices and the second plurality of data storage devices, the host system having a device mapper driver module for determining the first data layout and second data layout and for initiating or controlling performance of the sub-segment copying and the logical address compaction operation.

(A11) In some embodiments of the method of any of A1-A10, wherein the segments in the first and second pluralities of segments have a fixed segment size, the sub-segments in each of the segments have a fixed sub-segment size, and the blocks in each of the sub-segments have a fixed block size.

(A12) Some embodiments include a method of managing a data storage system having a first plurality of data storage devices, including, at a controller system having one or more processors and a communications interface for communicatively coupling the controller system to data storage devices in the storage system, in response to adding a set of one or more storage devices to the first plurality of data storage devices, thereby forming a second plurality of data storage devices, for a global logical address space divided into a first plurality of segments, each segment further divided into a first plurality of sub-segments, wherein, in accordance with a first data layout, each sub-segment of each segment in the first plurality of segments for which data is stored, or is to be stored, in the first plurality of data storage devices is mapped to a respective storage device in the first plurality of data storage devices and to a respective sub-segment offset in a local logical address space in the respective storage device: (1) determining for one or more segments in the first plurality of segments, a subset of that segment's sub-segments, the subset comprising sub-segments that are to be copied; (2) copying each respective sub-segment in the determined subset from a source storage device to which the respective segment is mapped by the first data layout to a destination storage device to which the respective sub-segment is mapped by a second data layout, wherein the destination storage device is in the set of one or more added storage devices; (3) in the source storage device to which the respective segment is mapped by the first data layout, adding a local logical address range for the respective sub-segment to a free list for the source storage device; and (4) in the source storage device, performing a logical address compaction operation by remapping one or more local logical address ranges, corresponding to one or more sub-segments in the global logical address space mapped to the source storage device by the second data layout, to logical address ranges in the free list for the source storage device, without moving data corresponding to the remapped one or more logical address ranges.

(A13) In some embodiments, a memory controller comprises a storage interface, a communications interface, and a processing module. The storage interface couples the memory controller to a plurality of data storage devices. The communication interface communicatively couples the memory system to data storage devices in the first plurality of data storage devices. The processing module processes addition of a data storage device by performing a sequence of operations, including: for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in the first plurality of data storage devices to a respective data storage device in the first plurality of data storage devices and to a respective sub-segment offset in a local logical address space in the respective data storage device; in response to adding one or more data storage devices to the first plurality of data storage devices, thereby forming a second plurality of data storage devices: determining a second data layout that maps each sub-segment of each segment in a second plurality of segments for which data is stored, or is to be stored, in the second plurality of data storage devices to a respective data storage device in the second plurality of data storage devices and to a respective sub-segment offset in a local logical address space in the respective data storage device, wherein the second plurality of segments includes the first plurality of segments and additional segments; for one or more respective segments in the first plurality of segments: for one or more respective sub-segments in the respective segment for which the second data layout maps the respective segment to a different data storage device than the data storage device to which the respective segment is mapped by the first data layout: copying the respective sub-segment from a source data storage device to which the respective segment is mapped by the first data layout to a destination data storage device to which the respective sub-segment is mapped by the second data layout; in the source data storage device to which the respective segment is mapped by the first data layout, adding the local logical address range for the respective sub-segment to a free list for the source data storage device; and in a source data storage device, for which at least one respective sub-segment has been copied to a respective destination data storage device, performing a logical address compaction operation by remapping one or more local logical address ranges to logical address ranges in the free list for the source storage device, without moving data corresponding to the remapped one or more logical address ranges.

(A14) In some embodiments of the memory controller of A13, the memory controller is configured to perform and/or initiate the performance of the method of any of A2 to A11.

(A15) In some embodiments of the memory controller of any of A13-A14, the memory controller comprises a host system external to the first plurality of data storage devices and the second plurality of data storage devices, the host system having a device mapper driver module for determining the first data layout and second data layout and for initiating or controlling performance of the sub-segment copying and the logical address compaction operation.

(A16) In some embodiments, a data storage system comprises the memory controller of A13.

(A17) In some embodiments, a non-transitory computer readable storage medium stores one or more programs configured for execution by a memory controller configured to be coupled to a plurality of data storage devices. The one or more programs include instructions that when executed by one or more processors of the memory controller, cause the memory controller to: for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in the first plurality of data storage devices to a respective data storage device in the first plurality of data storage devices and to a respective sub-segment offset in a local logical address space in the respective data storage device; in response to adding one or more data storage devices to the first plurality of data storage devices, thereby forming a second plurality of data storage devices: determining a second data layout that maps each sub-segment of each segment in a second plurality of segments for which data is stored, or is to be stored, in the second plurality of data storage devices to a respective data storage device in the second plurality of data storage devices and to a respective sub-segment offset in a local logical address space in the respective data storage device, wherein the second plurality of segments includes the first plurality of segments and additional segments; for one or more respective segments in the first plurality of segments: for one or more respective sub-segments in the respective segment for which the second data layout maps the respective segment to a different data storage device than the data storage device to which the respective segment is mapped by the first data layout: copying the respective sub-segment from a source data storage device to which the respective segment is mapped by the first data layout to a destination data storage device to which the respective sub-segment is mapped by the second data layout; in the source data storage device to which the respective segment is mapped by the first data layout, adding the local logical address range for the respective sub-segment to a free list for the source data storage device; and in a source data storage device, for which at least one respective sub-segment has been copied to a respective destination data storage device, performing a logical address compaction operation by remapping one or more local logical address ranges to logical address ranges in the free list for the source storage device, without moving data corresponding to the remapped one or more logical address ranges.

(A18) In some embodiments of the non-transitory computer readable storage medium of A17, the one or more programs include instructions for performing the method of any of A2 to A11.

(A19) In some embodiments of the non-transitory computer readable storage medium of any of A17 to A18, the memory controller comprises a host system external to the first plurality of data storage devices and the second plurality of data storage devices, the host system having a device mapper driver module for determining the first data layout and second data layout and for initiating or controlling performance of the sub-segment copying and the logical address compaction operation.

Numerous details are described herein to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Even though solid state drives are but one example of the data storage devices discussed in this document, in several of the figures, data storage devices 120 are labeled "SSD"

and storage buffers 150 are labeled "SSD buffer 150" or "buffer 150" to conserve space.

FIG. 1A is a block diagram illustrating a distributed system 102 that includes an implementation of a non-volatile memory system 100, coupled over a network 101 to a plurality of host systems 110 (sometimes called host computer systems, host devices, or hosts) in accordance with some embodiments. In some embodiments, non-volatile memory system 100 includes a non-volatile data storage device 120 (also sometimes called a data storage device, an information storage device, a storage device, or a memory device). Data storage device 120 may include a single flash memory device, or (more typically) a plurality of flash memory devices that are NAND-type flash memory or NOR-type flash memory. Data storage device 120 may include one or more hard disk drives (HDDs). In some embodiments, data storage device 120 includes one or more three-dimensional (3D) non-volatile memory devices. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, non-volatile memory system 100 (sometimes called a data storage system or storage system) includes one or more non-volatile data storage devices 120.

In FIG. 1A, host systems 110 are coupled to a controller system 130 of non-volatile storage system 100 through network 101. However, in some embodiments a respective host system 110 includes a storage controller, or a portion of controller system 130, as a component and/or as a subsystem. For example, in some embodiments, some or all of the functionality of storage controller 130 is implemented by software or hardware within at least one of the host systems 110. A respective host computer system 110 may be any suitable computer device, such as a computer, a laptop computer, a tablet device, a netbook, an internet kiosk, a personal digital assistant, a mobile phone, a smart phone, a gaming device, a computer server, or any other computing device. Each host computer system 110 is sometimes called a host, host system, client, or client system. In some embodiments, a respective host computer system 110 is a server system, such as a server system in a data center. In some embodiments, a respective host computer system 110 includes one or more processors, one or more types of memory, a display and/or other user interface components such as a keyboard, a touch-screen display, a mouse, a track-pad, a digital camera, and/or any number of supplemental I/O devices to add functionality to host computer system 110. In some embodiments, host computer system 110 does not have a display and other user interface components.

Within the illustrative non-volatile memory system 100, a controller system 130 is coupled to network 101 and to one or more data storage devices 120 through connections 135. Controller system 130 is a controller for controlling access to data storage devices 120 and bi-directional processing of read and write commands and associated data between networked host systems 110 and data storage devices 120, such as solid state drives (SSDs). The controller may be a non-volatile memory express (NVMe) controller, a Redundancy Coding controller (e.g., a redundant array of independent disks (RAID) controller), or as described in further detail below another type of CPU or processor for controlling access to non-volatile storage devices. In some embodiments, the controller system 130 is a host system or device, or a controller module in a data storage device. Network 101 and connections 135 are sometimes called data connections, but typically convey commands in addition to data, and optionally convey metadata, error correction information and/or other information in addition to data values to be stored in data storage devices 120 and data values read from data storage devices 120. In some embodiments, however, controller 130 and data storage devices 120 are included in the same device (i.e., an integrated device) as components thereof. Furthermore, in some embodiments, data storage devices 120 are embedded in a host device (e.g., computer system 110), such as a mobile device, tablet, other computer or computer controlled device, and the methods described herein are performed, at least in part, by the embedded storage controller.

In some embodiments, data storage devices 120 include any number (i.e., one or more) of memory devices including, without limitation, persistent memory or non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) can also be configured for relatively smaller-scale applications such as personal flash drives or hard-disk replacements for personal, laptop, and tablet computers.

Data storage devices 120 further include buffers 150 (sometimes called storage buffers) that may be allocated by the controller system 130 as part of its directly accessible memory space for use when writing data to or reading data from data storage devices 120 using remote DMA operations. Similarly, a host system 110 may include a host buffer 115 that is directly accessible by the controller system 130 during remote DMA operations.

Figure 3:
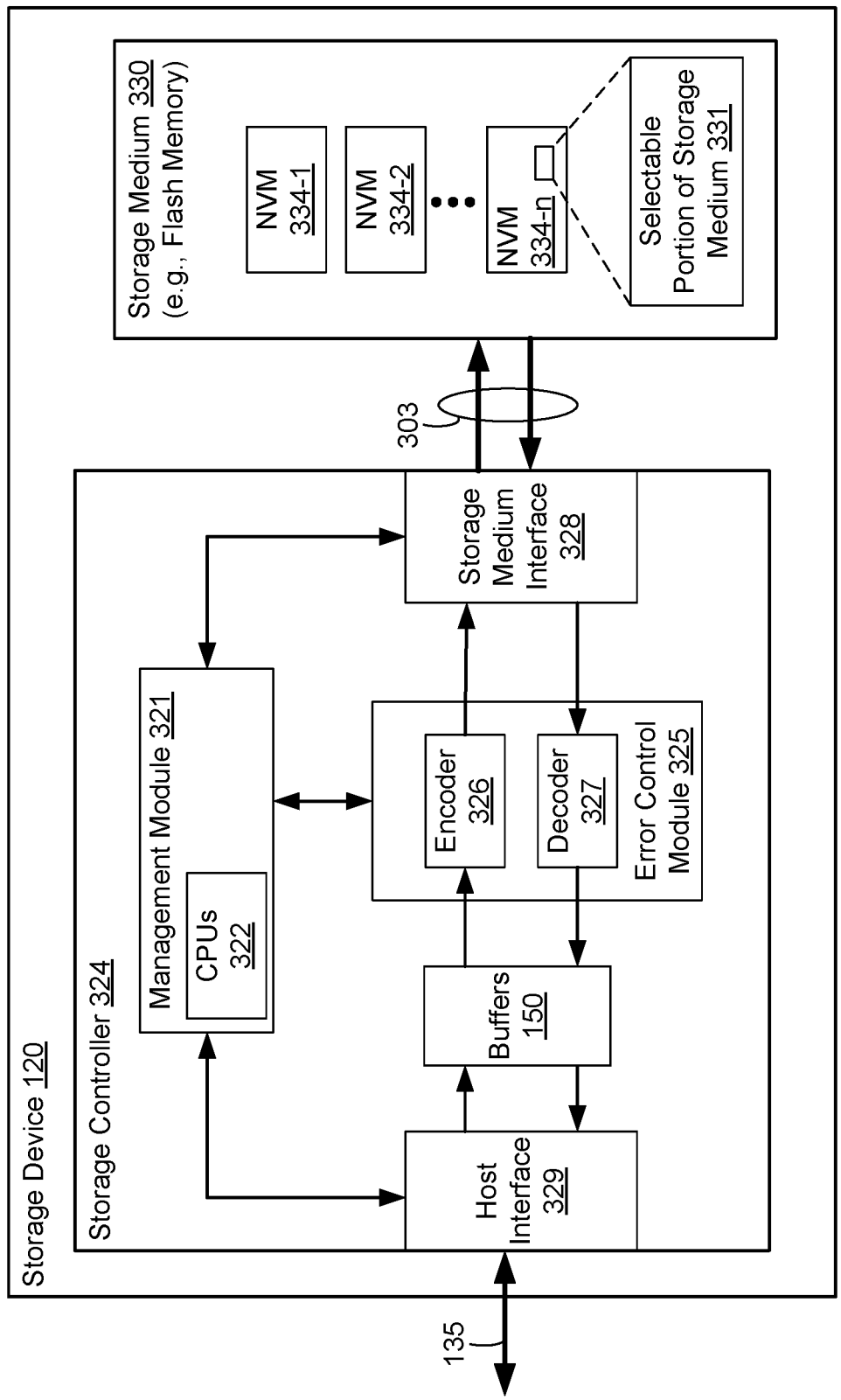
FIG. 3 is a block diagram of a data storage device that is part of a non-volatile memory system, in accordance with some embodiments.

Referring to FIG. 3, each data storage device 120 includes a storage controller 324 (e.g., a solid state drive controller, sometimes called an SSD controller) and a storage medium 330. Storage medium 330 includes memory devices (e.g., NVM 334-1, NVM 334-2, etc.), each of which include addressable and individually selectable blocks. Storage medium 330 includes individually selectable portions 331 (also referred to herein as a selected portion 331). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing data to or reading data from the flash memory device.

In some embodiments, storage controller 324 includes a management module 321, a host interface 329, storage buffers 150, an error control module 325 and a storage medium interface 328. Storage controller 324 may include various additional features that have not been illustrated for the sake of brevity and so as not to obscure pertinent features of the example embodiments disclosed herein, and a different arrangement of features may be possible. Host interface 329 provides an interface, for devices external to data storage device 120, to the data storage device 120 through data connections 135, and provides an interface for data storage device 120 to devices (e.g., host systems 110 and other data storage devices 120) external to data storage device 120. Host interface 329 is sometimes called a bus interface. Similarly, storage medium interface 328 provides an interface to storage medium 330 through connections 303. In some embodiments, storage medium interface 328 includes read and write circuitry, including circuitry capable of providing reading signals to storage medium 330 (e.g., reading threshold voltages for NAND-type flash memory).

In some embodiments, storage buffers 150 are implemented using non-volatile random access memory (sometimes called non-volatile RAM or NVRAM), such as battery-backed dynamic random access memory (DRAM). At least some of the storage buffers 150 may be directly accessible to not only the memory management module 321, but also the controller system 130 (FIG. 1A) via data connections 135, which may be any suitable bus or network, and may use any suitable protocol, such as SATA or PCI express. In some embodiments, storage buffers 150 are allocated by the controller system 130 and the data storage device 120 to facilitate remote DMA operations between a host 110 and a data storage device 120.

In some embodiments, management module 321 includes one or more processing units 322 (sometimes herein called CPUs, processors, or hardware processors, and sometimes implemented using microprocessors, microcontrollers, or the like) configured to execute instructions in one or more programs (e.g., in management module 321). In some embodiments, the one or more CPUs 322 are shared by one or more components within, and in some cases, beyond the function of storage controller 324. However, in some embodiments, management module 321 does not include any CPUs or processors that execute instructions in one or more programs, and instead includes an application specific integrated circuit (ASIC) or field programmable gate array (FPGA) that implements one or more state machines to perform the functions of management module 321.

Management module 321 is coupled to host interface 329, error control module 325 and storage medium interface 328 in order to coordinate the operation of these components. In some embodiments, one or more modules of management module 321 are implemented by a host computer system 110. Management module 321 is coupled to storage medium 330, via storage medium interface 328, in order to manage the operation of storage medium 330.

Error control module 325 is coupled to storage medium interface 328, storage buffers 150, and management module 321. Error control module 325 is provided to limit the number of uncorrectable errors inadvertently introduced into data during writes to memory or reads from memory. In some embodiments, error control module 325 is executed in software by the one or more CPUs 322 of management module 321, and, in other embodiments, error control module 325 is implemented in whole or in part using special purpose circuitry to perform data encoding and decoding functions. To that end, error control module 325 includes an encoder 326 and a decoder 327. Encoder 326 encodes data by applying an error control code to produce a codeword, which is subsequently stored in storage medium 330.

When the encoded data (e.g., one or more codewords) is read from storage medium 330, decoder 327 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, a respective buffer 150 (sometimes called an input buffer or allocated buffer) receives data to be stored in storage medium 330 from computer system 110 via a remote DMA operation that is controlled by controller system 130 of memory system 100. The data held in the allocated buffer 150 is made available to encoder 326, which encodes the data to produce one or more codewords. The one or more codewords are made available to storage medium interface 328, which transfers the one or more codewords to storage medium 330 in a manner dependent on the type of storage medium being utilized. To initiate the write, the memory management module 321 receives from the controller system 130 a translated write command, which includes information sufficient to transfer the data to be written from the allocated buffer 150 to a location in the storage medium 330. In some embodiments, memory management module 321 includes completion logic that notifies controller system 130 when the data associated with the command has been written from to the allocated buffer 150.

A read operation is initiated when a respective host computer system 110 sends a host read command (e.g., in a set of one or more host read commands, sent, for example, via network 101) to the controller system 130, which translates the received host read command (e.g., into a lower level data storage device command, sometimes herein called a translated command, suitable for execution by a data storage device 120) and sends the translated command to the storage controller 324 of a respective data storage device 120 (see FIG. 1A), requesting data from storage medium 330. Storage controller 324 sends one or more read access commands to storage medium 330, via storage medium interface 328, to transfer raw read data in accordance with memory locations (addresses) specified by the one or more host read commands. Storage medium interface 328 provides the raw read data (e.g., comprising one or more codewords) to decoder 327. If the decoding is successful, the decoded data is provided to an output buffer 150 allocated by the controller system 130, where the decoded data is made available to computer system 110 via a remote DMA operation using the controller system 130. In some embodiments, if the decoding is not successful, storage controller 324 may resort to a number of remedial actions or provide an indication of an irresolvable error condition. The memory management module 321 may further include completion logic that notifies the controller system 130 when the data associated with the command is in the allocated buffer 150 and ready to be sent directly to the host via RDMA.

Figure 1B:
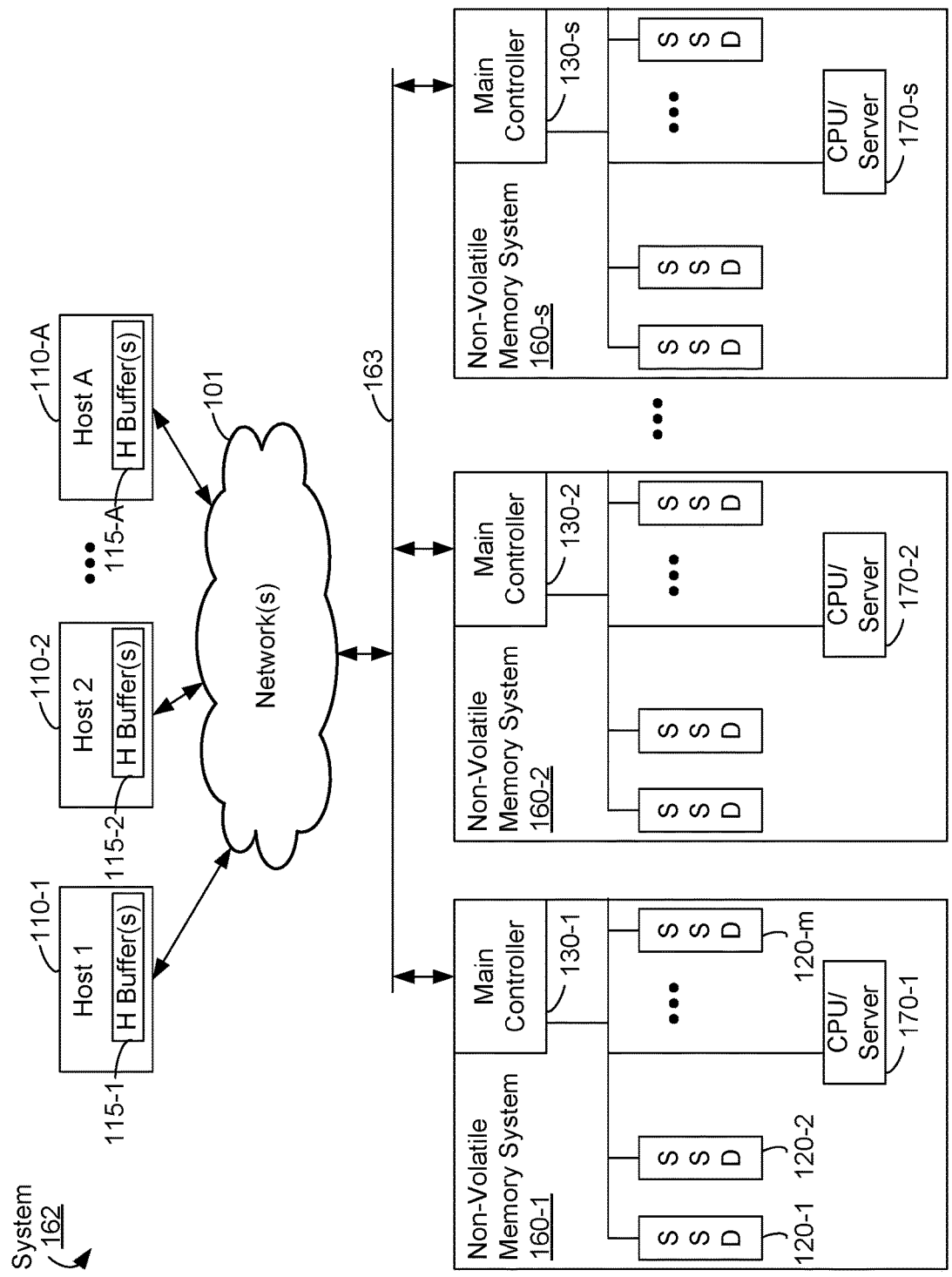
FIG. 1B is a block diagram illustrating a distributed computing system that includes one or non-volatile memory systems that include a compute engine or server, in accordance with some embodiments.

FIG. 1B is a block diagram illustrating a distributed computing system 162 that is similar to distributed system 102 (FIG. 1A). However, system 162 includes one or more non-volatile memory systems 160 that each include a compute engine or server 170, in accordance with some embodiments. Those aspects of system 162 that are the same or similar to system 102, FIG. 1A, have the same reference numbers, and to the extent they are the same as in system 102, will not be discussed again, to avoid needless repetition. As shown in FIG. 1B, system 162 includes two or more non-volatile memory systems 160 (e.g., NVM systems 160-1, 160-2 to 160-s, where s is an integer greater than 1), which are sometimes collectively called storage system 180. In some embodiments, system 162 includes at least one, and in some embodiments, system at least two NVM systems 160 that each include an internal compute engine or server 170. In FIG. 1B, NVM systems 160 are shown as being interconnected by a network or communication bus 163. Functionally, and for purposes of the explanations that follow, network or communication bus 163 is included in network(s) 101. However, in some embodiments, network of communication bus 163 is separate from network(s) 101, and instead is part of storage system 180 instead of network(s) 101.

In some such embodiments, the compute engine/server 170 (e.g., 170-1, 170-2 or 170-s) of the respective NVM system 160 is a compute engine that includes a hardware processor (e.g., a microprocessor, ASIC, state machine, or the like) and working memory (e.g., DRAM, SRAM, or other random access memory), for executing programs sent to it by one or more of hosts 110, herein called the requesting host for ease of explanation. For example, such program may be used to perform data intensive tasks, such as data mining, data analysis, report generation, etc., and to then send the results of those tasks back to the requesting host. In this way, large quantities of data needed for the data intensive tasks need not be transported across network(s) 101 to the requesting host, and instead only the programs and results are transported across network(s) 101.

In some other embodiments, the compute engine/server 170 is a server that includes a hardware processor (e.g., a microprocessor, ASIC, or the like) and working memory (e.g., DRAM, SRAM, or other random access memory), for executing programs, hosting applications, and providing services to client systems (e.g., any of hosts 110, as well as other client systems not shown in FIG. 1B). Thus, each NVM system 160 in such embodiments is an integrated host/server and storage system. In some such embodiments, host systems 110 are embedded in NVM systems 160, implemented using compute engines/servers 170. In some such embodiments, communication bus 163 effectively replaces network 101 for communications between the host systems/servers 170.

In both types of embodiments described above, compute engine/server 170 accesses information in the data storage devices (e.g., SSDs) of its NVM system 160 directly, using standard SSD access protocols, without going through controller system 130. However, to the extent it needs to access information stored in any of the data storage devices 120 of any of the other NVM systems 160, it is functionally the same as a host 110, conveying its request(s) to the other NVM system 160 via network(s) 101 (which includes network/communication bus 163, as explained above), and the controller system 130 of that NVM system 160.

Figure 2:
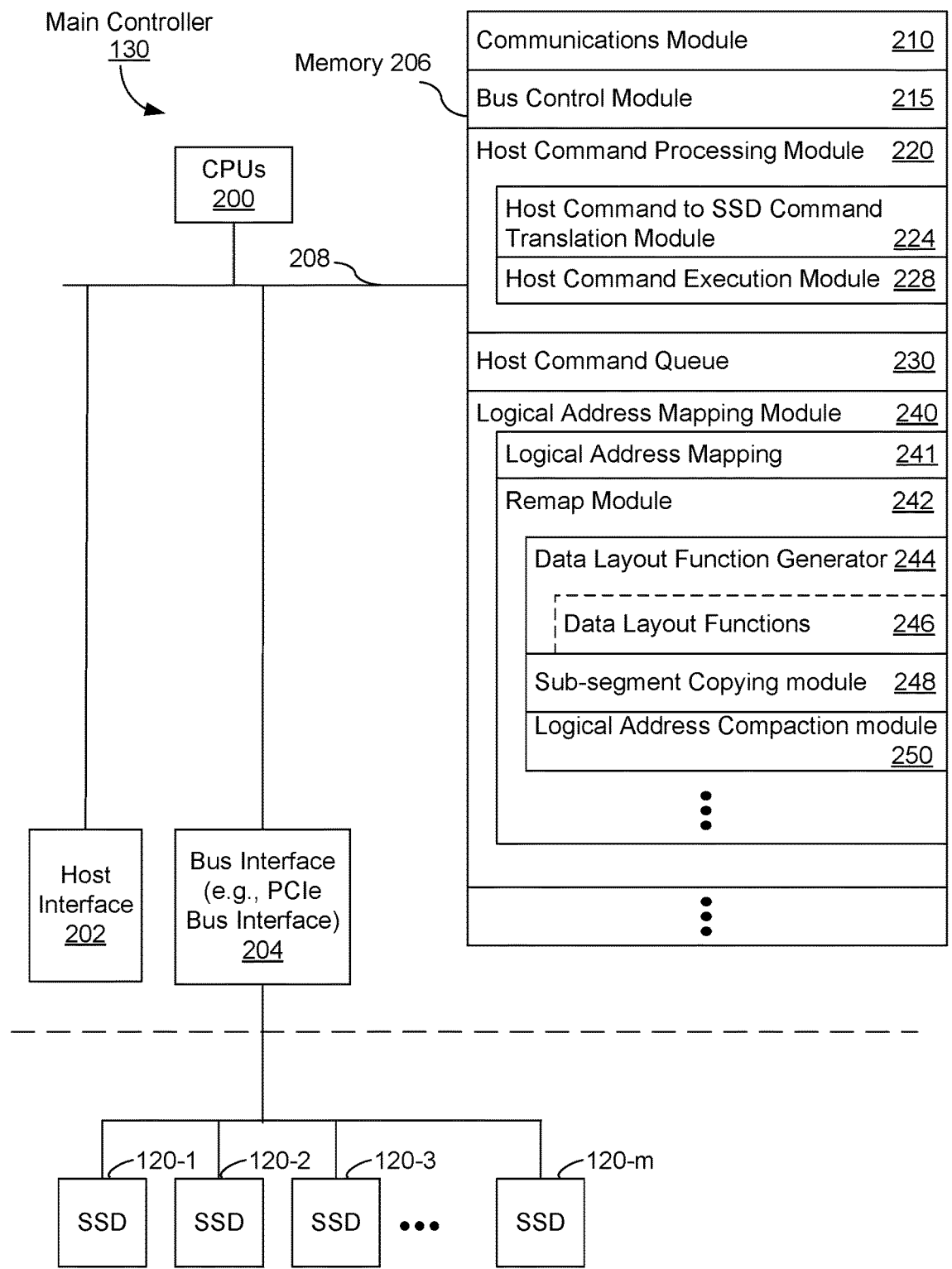
FIG. 2 is a block diagram illustrating an implementation of a controller, in accordance with some embodiments.

FIG. 2 is a block diagram illustrating an implementation of a controller system 130, in accordance with some embodiments. In some embodiments, controller system 130 includes one or more processors 200, sometimes called CPUs, or hardware processors, or microcontrollers; host interface 202 for coupling controller system 130 to one or more host systems 110 (FIG. 1A); bus interface 204 for coupling controller system to one or more communication busses (e.g., connections 135, FIG. 1A); memory 206 (sometimes herein called controller memory); and one or more communication buses 208 for interconnecting these components. Communication buses 208 optionally include circuitry (sometimes called a chipset) that interconnects and controls communications between system components.

Controller system 130 generally facilitates getting data into and out of non-volatile memory in data storage devices 120. Controller system 130 exchanges data over network 101 with host systems 110 via host interface 202. In some embodiments, controller system 130 may be a Redundancy Coding controller (e.g., a RAID controller) for storing and accessing data in an array of data storage devices (e.g., data storage devices 120). The one or more processors 200 execute modules, programs and/or instructions stored in memory 206 and thereby perform processing operations. In some embodiments, the one or more processors 200 are coupled to data storage devices 120 by communication buses 208. In other embodiments the coupling is indirect through, for example, bus interface 204, such as a PCI express bus interface. Other bus interfaces, including a SATA bus interface may also be used.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 200. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset or superset thereof:

communications module 210 used for communicating with other components, such as data storage devices 120, and host computer systems 110;
a bus control module 215 used for executing bus protocols and transferring data over busses between components;
a host command processing module 220 that receives commands (e.g., read and write commands) from host systems 110, allocates storage buffers 150 in data storage devices, and translates the host commands into data storage device commands to facilitate remote DMA transfers of data corresponding to the read and write commands between host buffers on host systems 110 and storage buffers 150 on associated data storage devices 120. To facilitate the translation of host commands, host command processing module 220 may include a host command to data storage device command (e.g., SSD command) translation module 224, which converts host commands into commands suitable for execution by data storage device 120, and optionally facilitates virtualizing addresses embedded in the host commands. Host command processing module 220 may further include a host command execution module 228 that facilitates executing received host commands, for example by setting up and executing remote DMA data transfers, and sending translated data storage device commands to respective data storage devices 120 for execution.
One or more host command queues 230, used to track commands received from hosts 110 and their associated translated commands; and
Logical address mapping module 240, used in some embodiments to translate addresses or name spaces in the received host commands into data storage device identifiers or data storage device addresses, as further described below.

The logical address mapping module 240 includes a logical address mapping procedure 241, for mapping a source logical address in the address space of a host system, for example a source logical address specified in a host command, to a destination device and a local logical address in a logical address space of the destination devices; and a remap module 242 that is used to remap logical address ranges when new storage nodes are added to the storage system. In some embodiments, the remap module 242 includes a data layout function generator 244 that is used to generate data layout functions during scale out. Optionally, in some embodiments, the data layout function generator stores data layout functions 246 previously generated (in anticipation of new storage nodes to be added, or in response to previous scale out operations). The stored data layout functions can be used or reused for future scale out operations. In some embodiments, the data layout functions 246 are computed while the storage system is offline, when new storage nodes are not actively being added, during idle time, or at other times so as not to impact performance of the data storage system.

The logical address mapping module 240 also includes a sub-segment copying module 248 to copy sub-segments or groups of data blocks from one storage device to another storage device in the data storage system. The main controller 130 can employ a number of methods for copying data from one storage device to another, including Remote Direct Memory Access (RDMA) using RDMA buffers, or initiating peer-to-peer data transfers between data storage devices (e.g., to copy sub-segments from one storage device to another).

The logical address mapping module 240 further includes a logical address compaction module 250 that is used to compact logical addresses released by the movement of data, e.g., logical addresses no longer used after data has been copied from those logical addresses in a first storage device to another storage device.

Each of the above identified elements may be stored in one or more of the previously mentioned memory devices that together form memory 206, and corresponds to a set of instructions and data for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 5A-5D.

Although FIG. 2 shows a controller system 130, FIG. 2 is intended more as a functional description of the various features which may be present in a controller system, or non-volatile memory controller, than as a structural schematic of the embodiments described herein. In practice, and as recognized by those of ordinary skill in the art, items shown separately could be combined and some items could be separated. Further, as noted above, in some embodiments, one or more modules of controller system 130 are implemented by one or more modules of host computer system 110.

In some embodiments, controller system 130 is implemented, at least in part, as a respective data storage device 120 (of the plurality of data storage devices in the data storage system 100 or 160, e.g., as shown in FIGS. 1A and 1B), to which has been added the host command processing module 220, host command queue 230, and logical address mapping module 240. In some of those embodiments, the respective data storage device 120 implementing controller system 130 is also a target for host read requests to read data from that data storage device and host write requests to write data to that data storage device.

Figure 4:
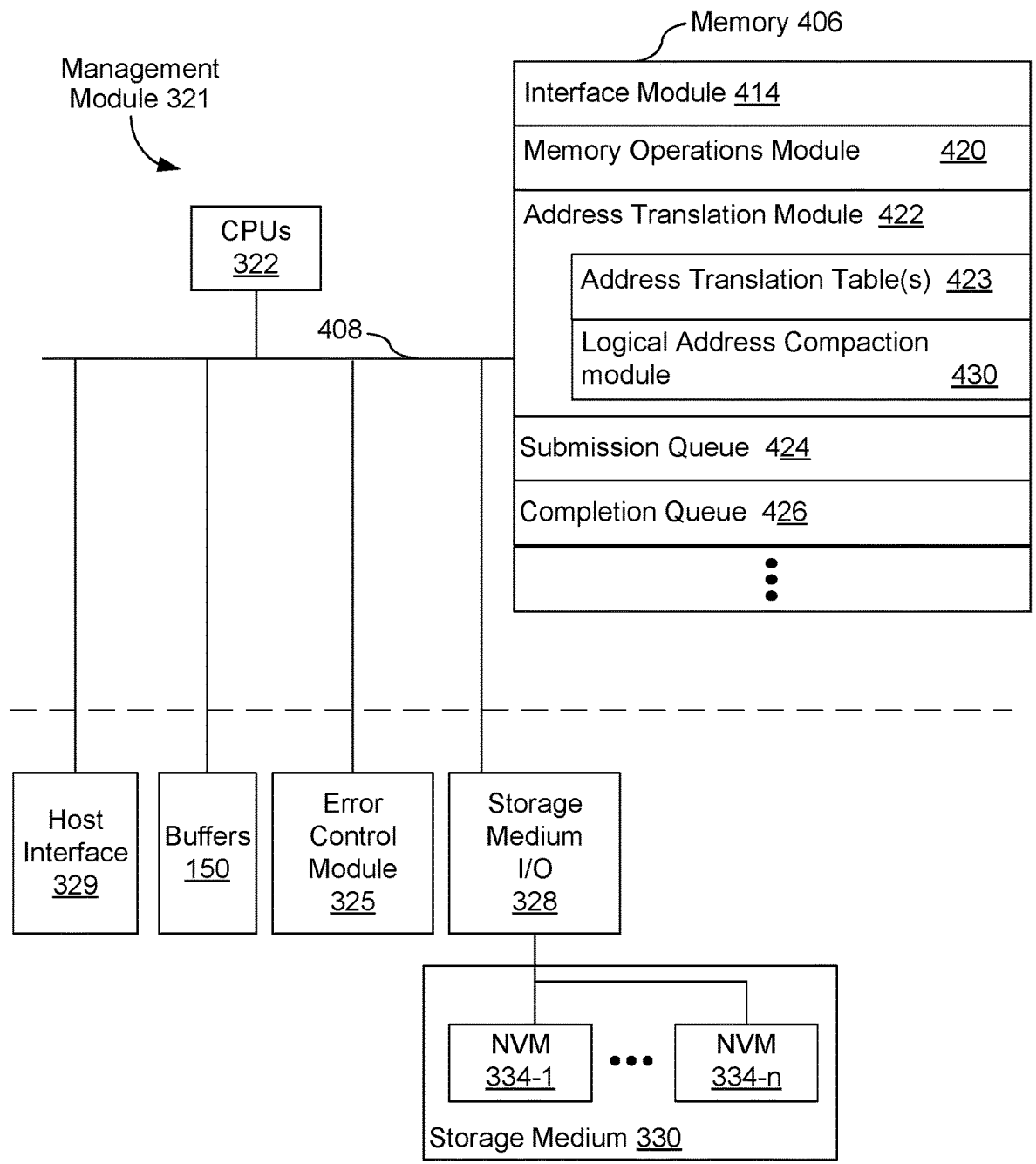
FIG. 4 depicts a block diagram of a memory management unit of a data storage device that is part of a non-volatile memory system, in accordance with some embodiments.

FIG. 4 depicts a block diagram of a management module 321, within a storage controller 324 of a data storage device 120 (e.g., a solid state drive) that is part of a non-volatile memory system 100 (FIG. 1A), in accordance with some embodiments. Thus, in some embodiments, each data storage device 120 of a non-volatile memory system 100 includes an instance of management module 321, while in some other embodiments, only some (e.g., one or more, or two or more, but less than all) of the data storage device 120 of non-volatile memory system 100 include an instance of management module 321.

Referring to FIG. 4, management module 321 includes one or more processing units 322 (further described above with reference to FIG. 3), coupled to memory 406, a host interface 329, buffers 150, error control module 325 and storage medium interface 328 over data connections 408. Additional elements may be included in the storage controller but are not shown here for brevity. Management module 321 controls access to the non-volatile media on its associated sold state drive.

Memory 406, sometimes called controller memory, includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 406 optionally includes one or more storage devices remotely located from processor(s) 322. Memory 406, or alternately the non-volatile memory device(s) within memory 406, comprises a non-transitory computer readable storage medium. In some embodiments, memory 406, or the computer readable storage medium of memory 406 stores the following programs, modules, and data structures, or a subset or superset thereof:

Interface module 414 used for communicating with controller system 130 via host interface 329, and optionally other components, such as non-volatile memory devices 334, via storage medium interface 328 and error control module 325.

A memory operations module 420 that executes read and write commands (sometimes herein called translated commands) received from controller system 130, and optionally allocates buffers 150 for receiving data to be stored in the data storage device and for receiving data read from the data storage device. In some other embodiments, controller system 130 allocates buffers 150. Execution of a respective write command includes writing data in one or more buffers 150 (allocated for storing the write data) into non-volatile storage medium 330. Execution of a respective read command includes reading data from non-volatile storage medium 330 to one or more buffers 150 allocated for execution of the read command. In some embodiments, each received read and write command is stored in a submission queue 424 until execution of the command by the data storage device is completed, after which it is moved to a completion queue 426. In some embodiments, after transfer of read data from buffers 150 to the requesting host system using RDMA, in the case of read commands, and after notification of execution completion in the case of write commands, the completed command is removed from completion queue.

In some embodiments, an Address Translation module 422 translates logical addresses in received (translated) commands into physical addresses in the physical address space of the data storage device, and updates one or more address translation tables 423 to keep track of the correspondence between logical and physical addresses. In some embodiments, address translation is performed by controller system 130 instead of the individual storage devices. Additionally, in some embodiments, the address translation module 422 also includes a Logical Address Compaction module 430 that is used to compact logical addresses (due to copying or moving of data to other storage devices). In some embodiments, the Logical Address Compaction module 430 operates stand-alone, whereas in other embodiments, the module 430 operates in co-ordination with a counterpart (e.g., Logical Address Compaction module 250) in the main controller, One or more submission queues 424 may be used to store status information regarding translated read and write commands received from hosts 110, the execution of which has not yet been completed; and One or more completion queues 426 may be used to store completion information regarding translated read and write commands received from hosts 110, the execution of which has been completed, which completion information may be propagated back to the hosts that sent the original commands.

Optionally, in some embodiments, memory 406, or the computer readable storage medium of memory 406 also stores a Peer-to-Peer (P2P) Data Transfer module (not shown), for transferring data (e.g., for sub-segment copying) between the data storage device 120 in which management module 321 resides and other data storage devices 120 (see FIG. 1A). In various embodiments, peer-to-peer communications between storage devices (e.g., SSDs) are implemented in various ways. For example, in some embodiments, P2P communications operate in full initiator mode, which enables a storage device to connect, to create commands, and to send the commands to other storage devices. In some other embodiments, a main controller (e.g., a host system) sets up shared memory areas in each data storage device, sends one or more commands to a source data storage device to read data in the source data storage device to a shared memory area, and then initiates the sending of data from the shared memory to a target storage device using DMA or remote DMA (RDMA).

Figure 5A:
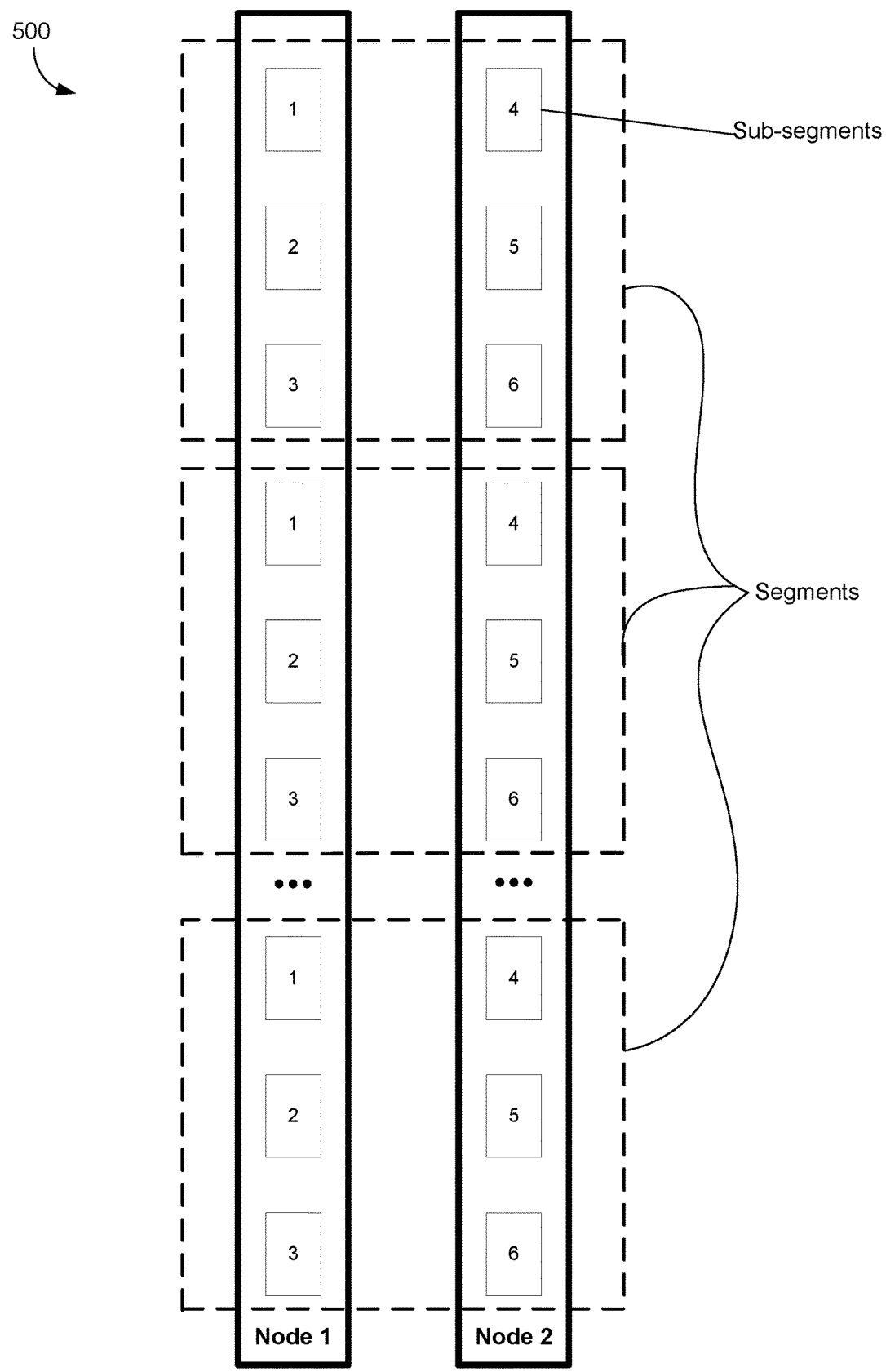
FIGS. 5A-5C illustrate a method of scale out transformation after adding storage nodes, in accordance with some embodiments.
Figure 5B:
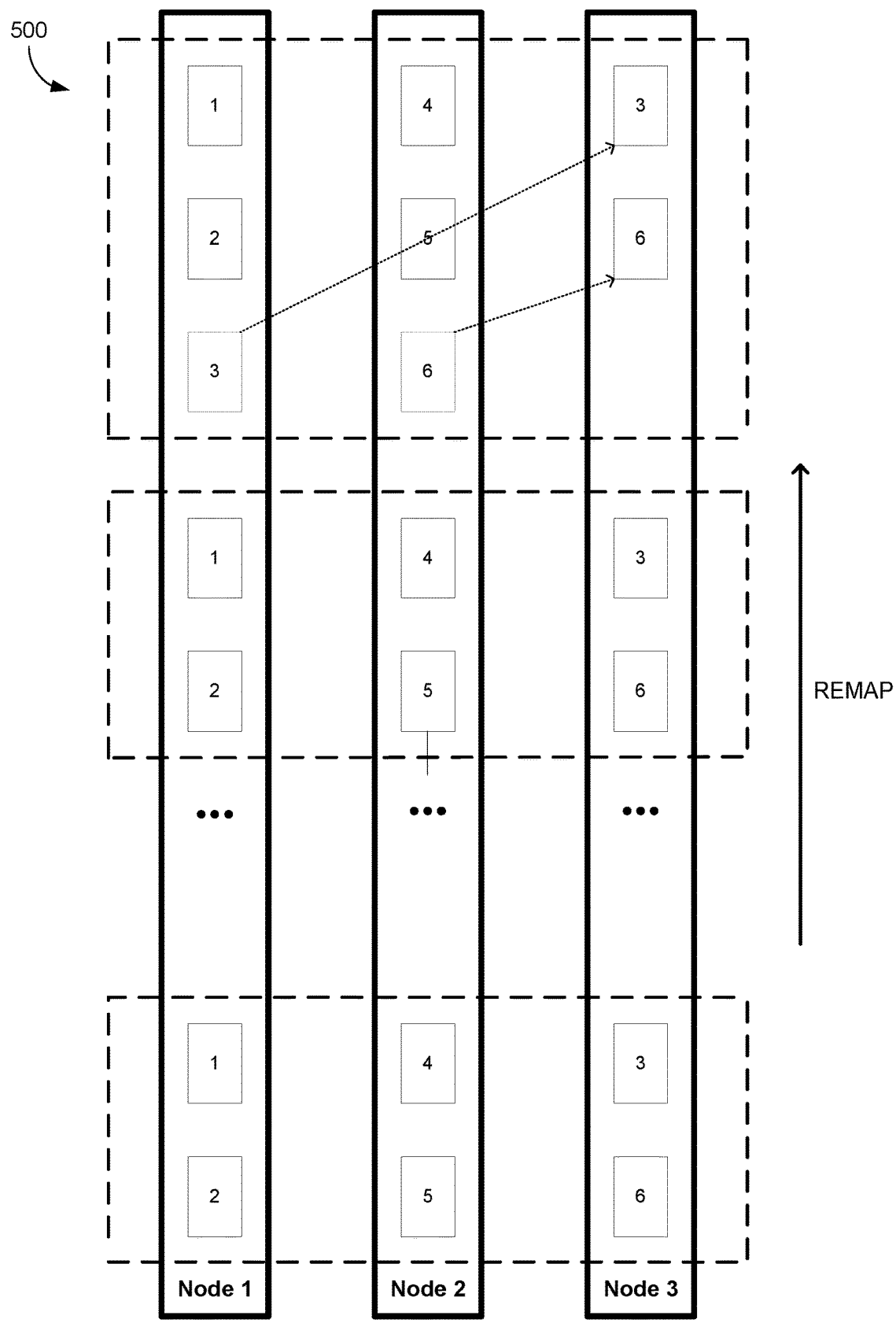
Figure 5C:
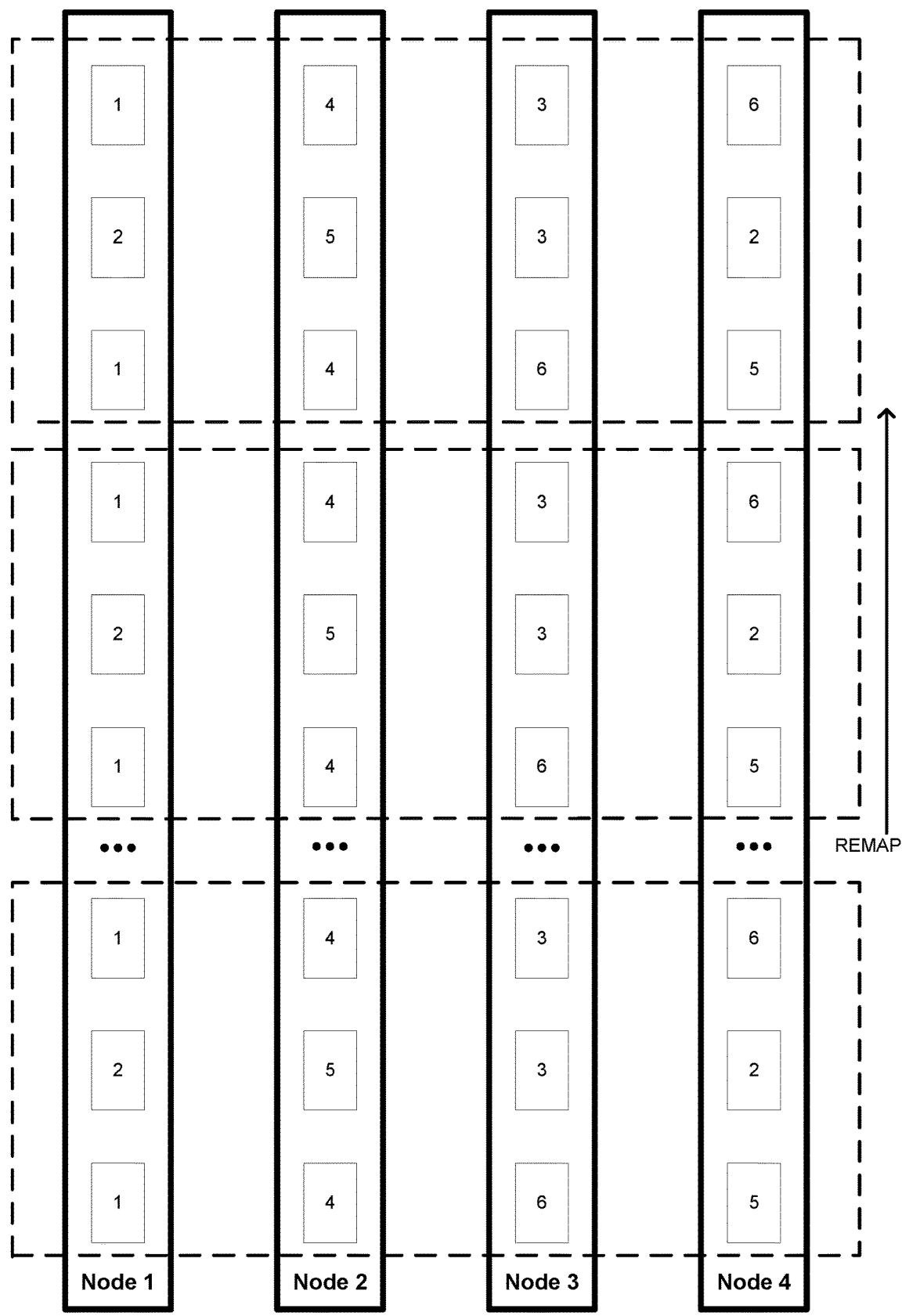

FIGS. 5A-5C illustrate a method of scale out transformation after adding storage nodes, in accordance with some embodiments. More specifically, FIGS. 5A-5C illustrate portions of the local logical address spaces of respective storage nodes, often herein called storage devices, to which data has been stored, or to which data will be stored when additional portions of the storage capacity of the storage system are used. Furthermore, the global address space of the storage system is represented in FIGS. 5A-5C by the entire group of segments, across all the storage nodes. FIG. 5A illustrates a first plurality of nodes, which in this example is two storage nodes (marked Node 1 and Node 2), according to some embodiments. In some embodiments, a node is a solid state drive (SSD). Storage capacity on the two nodes is split into equal-sized segments (in a global logical address space), with each segment including a portion or region of the local logical address space in each of the two storage nodes. For purposes of this discussion, it can be assumed that the size of the local logical address space of each storage node is equal to the declared storage capacity (e.g., the storage capacity usable by external devices, such as hosts 110, FIGS. 1A and 1B) of that storage node, and the size of the global address space of the storage system 100 or 160 is equal to storage capacity of the overall storage system (e.g., the storage capacity useable by external devices). Each segment includes (e.g., is split further into) a number of equal-sized sub-segments. In FIG. 5A (as well as FIG. 5B), the portion of each storage node occupied by each respective segment and sub-segment is represented the location, or range of locations, that the respective segment or sub-segment occupies in the local logical address space of that storage node. For the example shown, each segment has six sub-segments, with the numbered rectangles in FIG. 5A each representing the portion of the local logical address space of a respective storage node (e.g., storage device 120, FIG. 3) occupied by a corresponding sub-segment. The individual blocks within a sub-segment are not shown in these Figures. Each sub-segment in a data storage system has a fixed size, which is different from the variable size objects typically used in traditional scale-out solutions. In some embodiments, sub-segments are as small as one block (e.g., one erase block), but more typically have a size equal to multiple erase blocks (e.g., a size equal to 4 or more, or 8 or more, erase blocks).

Figure 6B:
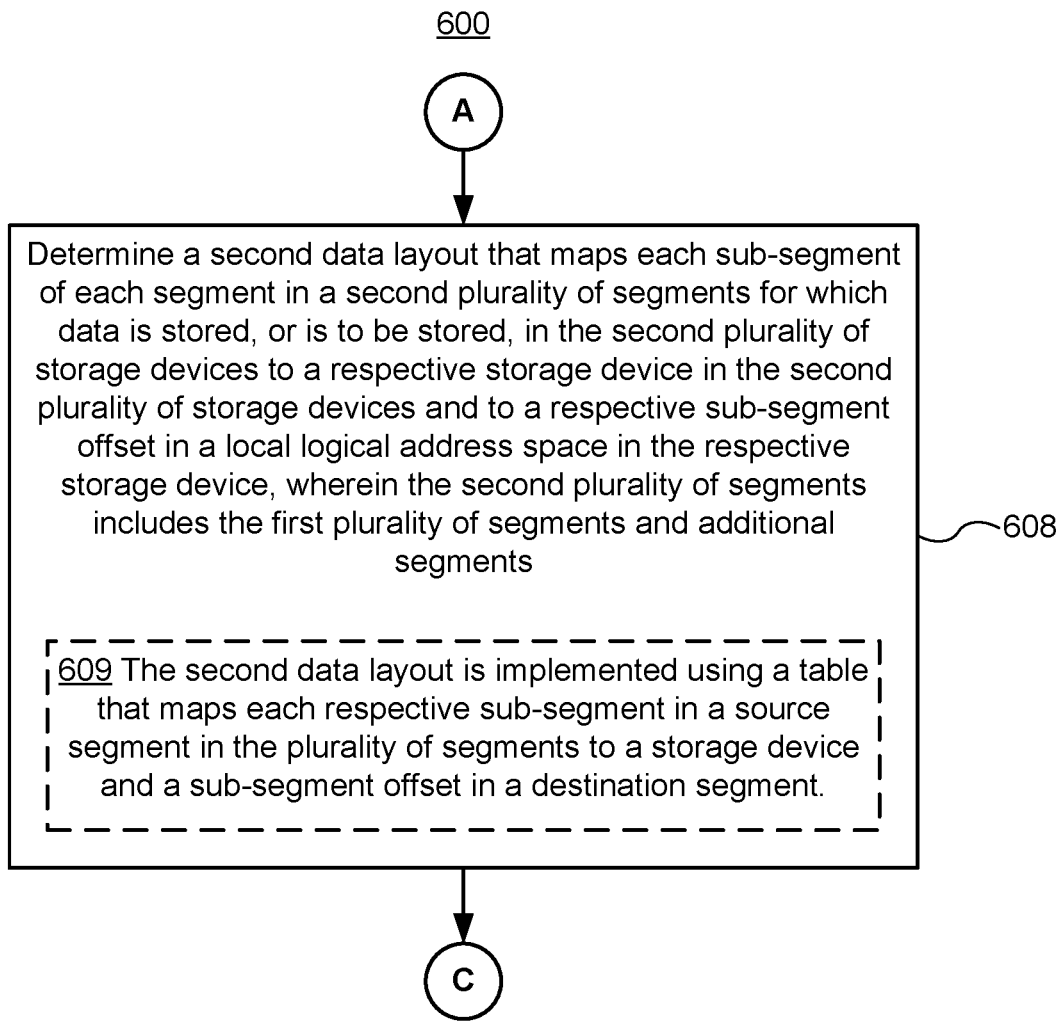
Figure 6C:
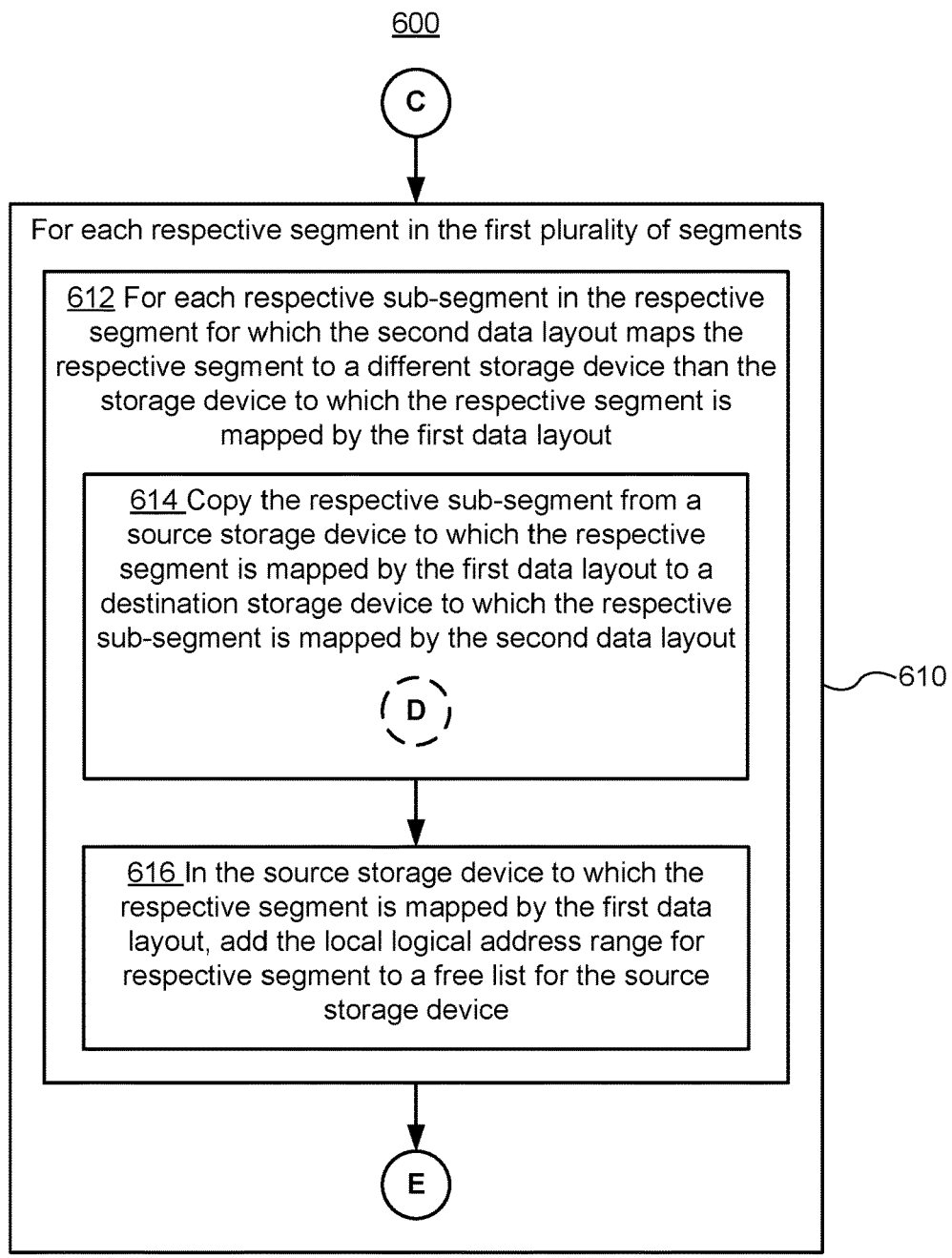

Similar to objects, sub-segments can be striped to improve sequential performance, where each of the sub-segments in a stripe have the same local logical address in each respective storage node in the stripe. This property of segments and their sub-segments allows for an efficient implementation of translation from a source logical block address to a destination logical block address on a destination storage device. A first data layout maps each sub-segment of each segment in the plurality of segments for which data is stored, or is to be stored, in the first plurality of data storage devices (e.g., the current set of nodes, such as Node 1 and Node 2 in FIG. 5A) to a respective data storage device in the first plurality of data storage devices and to a respective sub-segment offset in the local logical address space of the respective data storage device. This is further described below with reference to FIG. 6A.

In some embodiments, when determining the logical address, or logical block address, of a particular sub-segment, it is useful to determine the row number of the sub-segment in its segment. For example, in FIG. 5A, assuming that the first row or each segment is row 0, segment 6 is in row 2 of each segment, while in FIG. 5B, after the scale out procedure is performed, segment 6 is in row 1 of each segment. Similarly, each segment has a corresponding segment offset, and in some embodiments the segment offset of the first segment is zero. Accordingly, the logical address of a sub-segment in a determined destination storage device corresponds to the segment offset of the segment in which the sub-segment is located and the row number (sometimes called a sub-segment offset) of the sub-segment in that segment. For example, in some embodiments, the logical address of a sub-segment is equal to: a base logical address for the destination storage device, plus the segment offset multiplied by the fixed storage space occupied by each segment in the destination storage device, plus the sub-segment offset multiplied by the fixed storage space occupied by each sub-segment in the destination storage device. In some embodiments, the fixed storage space occupied by each segment in the destination storage device is represented by the (fixed) number of LBAs in the destination storage device per segment, and the fixed storage space occupied by each sub-segment in the destination storage device is represented by the (fixed) number of LBAs in the destination storage device per sub-segment.

FIG. 5B schematically illustrates a procedure to scale out the storage system shown in FIG. 5A, which includes adding one or more additional storage devices, thereby producing a second plurality of storage devices. The second plurality of storage devices shown in FIG. 5B includes Nodes 1, 2 and 3. A second data layout is determined, as further described below with reference to FIG. 6B. After the scale out, each of the segments in the system (e.g., as shown in FIG. 5B) include sub-segments in more storage devices, or nodes, than the segments in the system prior to the scale out (e.g., as shown in FIG. 5A). The number of segments used to store data immediately after the scale out (e.g., before any additional data is stored in the storage system) is typically the same as before the scale out, but the storage system has the capacity to store more segments (herein called a second plurality of segments) after the scale out than before the scale out. The second data layout maps each sub-segment of each segment in the second plurality of segments for which data is stored, or is to be stored, in the second plurality of storage devices (e.g., the set of storage devices shown in FIG. 5B) to a respective storage device in the second plurality of storage devices and to a respective sub-segment offset in a local logical address space in the respective storage device, wherein the second plurality of segments includes the first plurality of segments and additional segments. The difference between the first data layout and the second data layout indicates or identifies which sub-segments have to be copied over to one of the new storage nodes (or to the new storage node, if only one storage node has been added). For the example shown, sub-segments 3 and 6 (from Node 1 and Node 2, respectively) are copied to the new Node 3 as part of the scale out process. Once all the sub-segments that need to be move have been moved, logical addresses (in the logical address spaces of the storage nodes) released by the move are compacted. For example, within each storage node, addresses (in the logical address space of the storage node) in a subsequent segment are remapped (e.g., using a REMAP command in Linux driver) to use the freed space of just moved sub-segments of the current segment. The arrow in FIG. 5B marked REMAP indicates the direction of progress in this example. In some embodiments, segments are processed bottom-up, with segments appearing in the bottom of the Figure showing an updated state (after the respective sub-segments have been copied). FIG. 5B thus shows the state of the storage system when all but the top-most segment has been processed, and the controller is in the midst of processing the top-most segment.

FIG. 5C illustrates an example in which the number of sub-segments in each segment in the storage system cannot be evenly divided amongst the storage nodes after one or more new nodes have been added to the storage system. For the example shown, the six sub-segments in each segment cannot be evenly divided amongst four storage nodes, but the number of sub-segments in two segments, which is equal to 12 in this example, can be divided event amongst four storage nodes, as shown in FIG. 5C. Thus, at least for purposes of sub-segment mapping, multiple segments are combined into super-segments, where each super-segment has a number of sub-segments that can be evenly divided amongst the storage nodes in the storage system. Stated another way, the number of sub-segments in each super-segment in the plurality of super-segments is an integer multiple of the number of data storage devices after one or more data storage devices have been added to the data storage system. To avoid all doubt, it bears stating that each super-segment has the same number of segments as every other super-segment, and each segment has the same number of sub-segments (and blocks) as every other segment. Scale out using super-segments is described in more detail below with reference to FIG. 6G. It is further noted that while the examples shown in FIGS. 5A-5C have 2, 3 or 4 storage nodes, large scale data storage systems typically have significantly more storage nodes, for example 10 to 200 storage nodes. Furthermore, in implementations of the scale-out transformation methods and systems described herein, the proportion of data that is moved from one data storage device to another as part of the scale-out transformation is typically approximately equal to AN/TN (e.g., 2% where AN is equal to 2 and TN is equal to 100) and no more than (AN+1)/TN, where AN is the number of data storage devices (or storage nodes) added during the transformation and TN is the total number of storage nodes after the transformation.

FIGS. 6A-6H illustrate a flowchart representation of a method of scale out transformation after adding storage nodes, in accordance with some embodiments. As noted above, in some embodiments, to facilitate scaling performance when new storage devices are added to a data storage system (e.g., storage system 100, FIG. 1A), a controller system (e.g., controller system 130, FIG. 1A or 1B), determines a new data layout such that a minimal number of data blocks are copied to the newly added storage device in the one or more of the data storage devices 120 of the data storage system 100 or 160, and logical addresses released by the copy (move) are reallocated or compacted. This will now be described in more detail.

Method 600 is performed in a non-volatile memory system (e.g., NVM system 100, FIG. 1A) having a controller system (e.g., controller system 130) and a plurality of data storage devices (e.g., data storage devices 120-1 to 120-$m$, where m is an integer greater than 2, is typically an integer equal to 4 or more, and more typically is an integer equal to 6 or more or 8 or more), such as those shown in FIG. 1A. In some embodiments, the controller system has one or more processors (e.g., CPUs 200) and a communications interface (e.g., bus interface 204) for communicatively coupling the controller system to storage devices 120 in the storage system. As illustrated in FIG. 5A (described above), in some embodiments, a global logical address space corresponding to a data storage system 100 or 160, or corresponding to a distributed computing system 102 or 162, is divided into a first plurality of segments. Each segment is further divided into a first plurality of sub-segments, and each sub-segment is further divided into a number of blocks. For the sake of illustration, it is assumed that the storage system starts with an initial set, a first plurality of storage devices. The storage system in the example illustrated in FIG. 5A has two nodes. Segments have fixed size and sub-segments have fixed size that is smaller than the fixed size of the segments. In some embodiments (604), the controller system comprises a host system external to the storage devices 120, and the host system has a device mapper driver module (not shown) for determining data layouts (described below) and for initiating or controlling performance of sub-segment copying and logical address compaction operation (also described below).

The method includes, at the controller system, determining (602), using a mapping module (e.g., logical address mapping module 240, FIG. 2), a first data layout that maps each sub-segment of each segment in the first plurality of segments, for which data is to be stored, or is to be stored, in the first plurality of storage devices, to a respective storage device in the first plurality of storage devices and to a respective sub-segment offset in a local logical address space in the respective storage device. A sub-segment offset is the position of a sub-segment in a segment, and thus is an offset relative to the beginning or starting position of the segment in the respective storage device. In some embodiments, a sub-segment offset indicates an offset, starting position or relative position in the logical address space of the respective storage device. Alternatively, since sub-segments typically have a fixed size, the sub-segment offset may be expressed in terms of the number of sub-segments having earlier positions, within the segment, on the respective storage device. Thus, the offsets of first, second and third sub-segments (of a segment) mapped to a respective storage device may be expressed as 0, 1 and 2. In some embodiments, a data layout function generator (e.g., generator 244) generates the first data layout, and stores the first data layout in memory (e.g., in data layout functions 246).

When one or more storage devices is added to the first plurality of storage devices, the storage system now has a new set of storage devices, herein called a second plurality of storage devices. In order to scale performance of the storage system, the controller system responds (606) to the addition of the one or more storage devices by performing a sequence of operations (path indicated as 'A' in FIG. 6A) as illustrated by the flowchart in FIGS. 6B-6F. FIG. 5B exemplifies a situation that corresponds to these steps (path 'A'). The sequence of operations includes determining (608) a second data layout, using a data layout function generator (e.g., generator 244), that maps each sub-segment of each segment in a second plurality of segments for which data is stored, or is to be stored, in the second plurality of storage devices to a respective storage device in the second plurality of storage devices and to a respective sub-segment offset in a local logical address space in the respective storage device. The second plurality of segments includes the first plurality of segments and additional segments (e.g., the number of segments will typically increase due to the increase in storage capacity in the data storage system). In some embodiments, the second data layout is implemented (609) using a table that maps each respective sub-segment in a source segment in the plurality of segments to a storage device and a sub-segment offset in a destination segment. In some embodiments, the table is stored in memory 206 (e.g., as part of the data layout functions 246).

Once the second data layout is determined (608), the controller system iterates (610) through one or more of respective segments in the first plurality of segments, and optionally iterates through all of the segments in the first plurality of segments. For one or more respective sub-segments (e.g., for each respective sub-segment) in the respective segment for which the second data layout maps the respective segment to a different storage device than the storage device to which the respective segment is mapped by the first data layout (612), the controller system copies (614), using a copying module (e.g., sub-segment copying module 248), the respective sub-segment from a source storage device to which the respective segment is mapped by the first data layout to a destination storage device to which the respective sub-segment is mapped by the second data layout. For example, in FIG. 5B, sub-segment 3 from Node 1 and sub-segment 6 from Node 2 are copied to Node 3 (the new storage node added to the storage system).

Figure 6D:
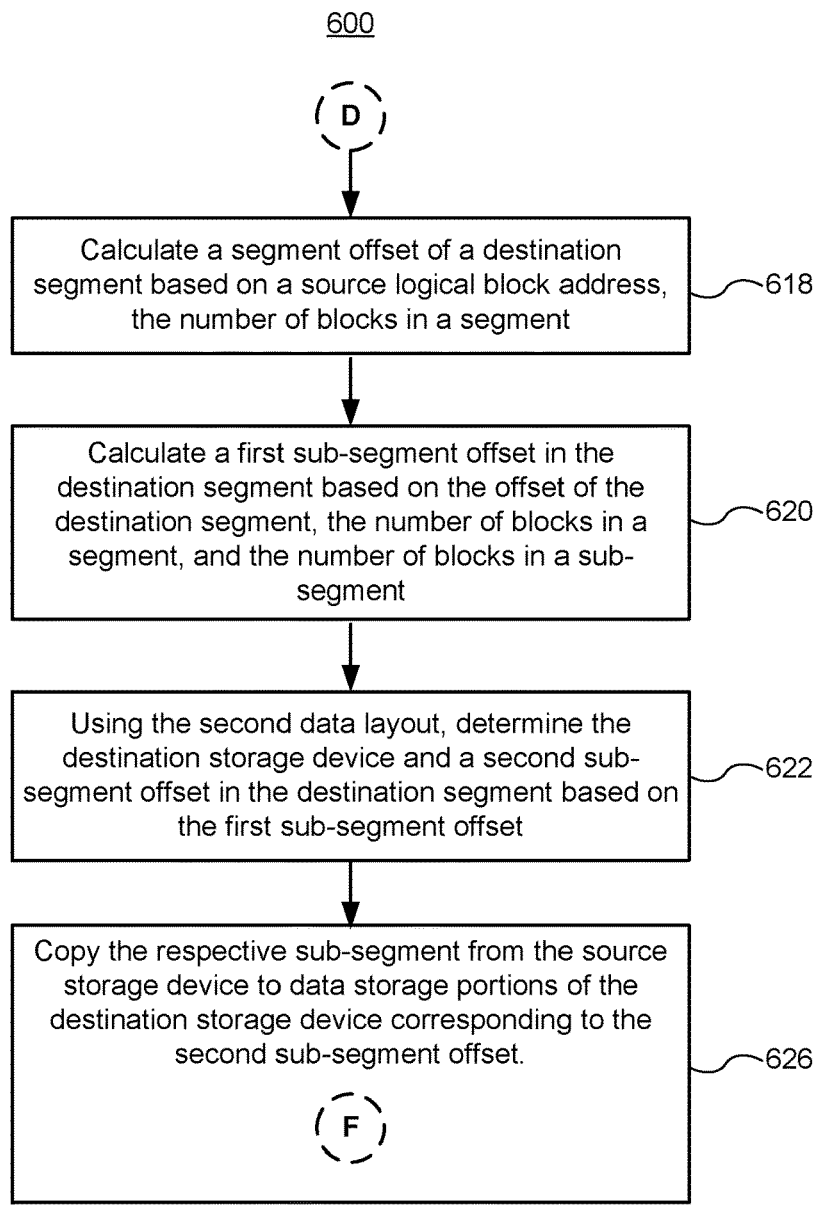

In some embodiments, the copying step 614 includes the sequence of steps shown in FIG. 6D (steps 618 through 626). The controller system calculates (618) a segment offset of a destination segment based on a source logical block address and the number of blocks in a segment. The controller system then calculates (620) a first sub-segment offset in the destination segment based on the offset of the destination segment, the number of blocks in a segment, and the number of blocks in a sub-segment. Using the second data layout, the controller system then determines (622) the destination storage device and a second sub-segment offset in the destination segment based on the first sub-segment offset. The storage system copies (626), using a copying module (e.g., sub-segment copying module 248), the respective sub-segment from the source storage device to data storage portions of the destination storage device corresponding to the second sub-segment offset in the destination storage device. In some embodiments, the data storage portions of the destination storage device corresponding to the second sub-segment are specified by the controller system as local logical-block addresses (local LBAs, sometimes herein called destination LBAs), in the local logical address space of the destination storage device, determined by the controller system (e.g., sub-segment copying module 248 of the main controller 130) in accordance with the segment offset of the destination segment and the second sub-segment offset. For example, in some embodiments, a first or lowest local LBA for the copying corresponds to a base local LBA (e.g., zero), plus a first offset corresponding to the destination segment (e.g., first offset=((destination segment offset) *(# of LBAs in the destination storage device per segment), where the segment offset of the first destination segment is zero), plus a second offset corresponding to the second sub-segment offset (e.g., determine the row number (row #) of the row of sub-segments in which the sub-segment being copied resides, where the row number of the first row is zero; second offset=((row #)*(# of LBAs per sub-segment)). In some embodiments, within the destination storage device, the copied data is stored to physical addresses within the non-volatile storage medium (e.g., 330, FIG. 4) of the destination storage device determined by the storage controller (e.g., 324, FIG. 3) of the destination storage device, and those physical addresses are mapped to the corresponding local logical addresses by an address translation module (e.g., 422, FIG. 4) of the destination storage device's storage controller.

Figure 6E:
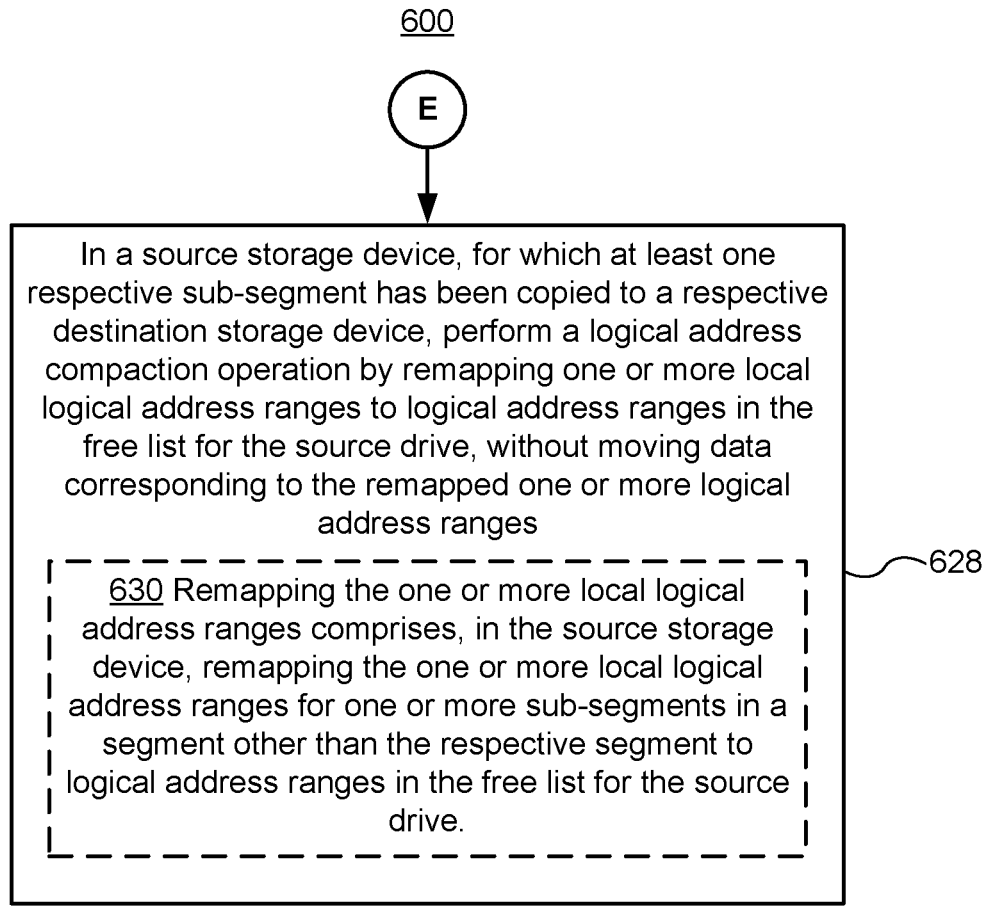
Figure 6F:
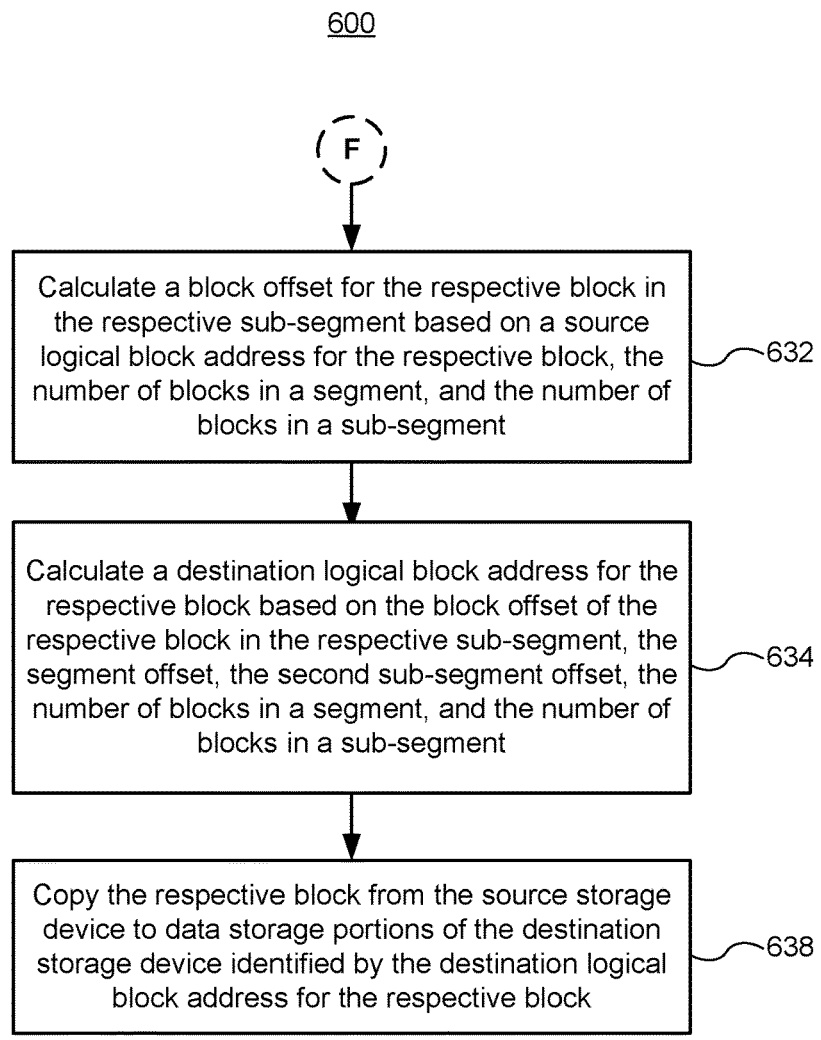

In some embodiments, the copying step (626) includes a sequence of steps shown in FIG. 6F (steps 632 through 638), which is performed for respective block in the respective sub-segment that is being copied to the destination storage device (and which is typically, but optionally, repeated for each respective block in the respective sub-segment). The controller system calculates (632) a block offset for the respective block in the respective sub-segment, based on a source logical block address for the respective block, the number of blocks in a segment, and the number of blocks in a sub-segment. The controller system then calculates (634) a destination logical block address for the respective block based on the block offset of the respective block in the respective sub-segment, the segment offset, the second sub-segment offset, the number of blocks in a segment, and the number of blocks in a sub-segment. The controller system copies (638), using a copying module (e.g., sub-segment copying module 248), the respective block from the source storage device to data storage portions of the destination storage device identified by the destination logical block address for the respective block. Although not shown in FIG. 2, in some embodiments, the sub-segment copying module 248 is implemented using a block copying module that is used to copy each block in a respective sub-segment from one storage device to another. Some embodiments implement copying from one storage device to another device using peer-to-peer communications. Some other embodiments use DMA operations orchestrated by the controller system. Once the respective sub-segment is copied (614) to a new storage device, in the source storage device to which the respective segment is mapped by the first data layout, the local logical address range for the respective sub-segment is added (616) to a free list for the source storage device. The free list indicates logical address ranges in the source storage device that are unused, and thus are available for use.

After a segment is processed in step 612, the controller system performs a logical address compaction operation (628) as shown in FIG. 6E. In a source storage device, for which at least one respective sub-segment has been copied to a respective destination storage device, the controller system performs a logical address compaction operation by remapping one or more local logical address ranges (e.g., the logical address range of a sub-segment in a neighboring segment) to logical address ranges in the free list for the source storage device, without moving data corresponding to the remapped one or more logical address ranges. For example, the logical address range of one or more segments in a neighboring segment may be shifted so as to fill an unused portion of the logical address space that was left empty by the copying of data to a destination storage device. The logical address compaction operation 628 is typically repeated for each source storage device from which at least one sub-segment has been copied to a respective destination storage device. In some embodiments, logical address compaction module (e.g., module 250 in FIG. 2) co-operates with a corresponding module in a storage device (e.g., module 420 in FIG. 4) both to identify logical addresses (or logical address ranges) available for subsequent processing by the respective storage device as well as to effect the actual address compaction.

As noted above, the scale out transformation process described above is typically repeated for each segment having valid data. At the end of this process, the data in the original (first) set of data storage drives has been redistributed over the enlarged (second) set of data storage drives, and the logical address spaces of the data storage drives have been compacted so that the portion of the logical address space of each data storage drive occupied by data is compact.

To further illustrate the scale out transformation depicted in the flowchart (FIGS. 6A-6F), an example is provided. Let us say the source logical block address (LBA) for a respective sub-segment is $I_s$, the number of blocks in each segment is S, and the number of blocks in each sub-segment is $S_s$. The controller system can compute a destination LBA $I_d$ and a destination storage device Node d using a series of steps as follows. It is noted that here and in other examples that follow this discussion, the symbol '/' is used to denote the mathematical operation of deriving a quotient by dividing a numerator by a denominator, and the symbol '%' is used to denote the mathematical operation of deriving a remainder by dividing a numerator by a denominator. First, an offset of a destination segment o is computed as $I_s/S$. Next, a sub-segment offset $o_s$ inside the destination segment is computed as $(I_s \% S)/S_s$. Next, a block offset $o_b$ inside the destination sub-segment is calculated using the formula $(I_s \% S) \% S_s$. The destination node and sub-segment offset in the destination segment on it (d, $o_d$) is then computed using a function $F(o_s)$. Function $F(o_s)$ defines distribution of LBAs in each segment, and may be represented as a simple array or table containing (d, $o_d$) pairs for each sub-segment in the segment. The distribution of LBAs is the same for all segments, and as a result, the function occupies limited space in memory. For instance, with 5000 sub-segments, sufficient to scale out up to 5000 nodes, 2 bytes per entry is sufficient, and the size of the F( ) array size is only 5000*2=10 kilobytes. Finally, the destination block is located on Node d with a LBA $I_d$ by summing up the offsets computed as $o+o_d+o_b$. Thus, the example outlined can be used to implement efficient and flexible mathematical addressing of each sub-segment, i.e., translation from source LBA to destination LBA on a storage device.

Based on the example LBA mapping described in the previous paragraph, a sample procedure to scale out, in accordance with some embodiments, is described to further illustrate the flowchart in FIGS. 6A-6F. When a new storage node is added to the storage system (e.g., as in FIG. 5B), as a first step, the controller system (or a module therein) transforms the function F(o) to a new function G(o) to reflect a new data layout, for distributing the storage of data across the increased set of nodes. The controller system may use a stable hash to effect this transformation. FIG. 5B shows a simple example, where just the last sub-segment from each node is moved to the new node. The controller system then iterates for each segment that contains valid data (say for a total of n segments that contain valid data) by moving affected sub-segments to the new node, as required by the F(o) to G(o) transformation. Next, the controller system remaps (e.g., using Linux system REMAP) a neighboring segment so that some of the neighboring segment's sub-segments occupy the freed space (in logical address space) previously occupied by the just moved sub-segments of this segment. In some embodiments, remapping a sub-segment is accomplished, at least in part, by updating the address translation tables (e.g., address translation tables 423, FIG. 4) used to map logical addresses to physical addresses, which does not require moving any data to new physical memory locations. In addition, in some embodiments, a host system or software application is provided information specifying the remapping, thereby enabling the host system or software application to change the logical addresses used by that system or application. The controller system then moves on to the next segment and repeats this procedure, until all segments having valid data have been remapped using the new data layout. Thus, this example procedure uses LBA remapping instead of data copying to continue to maintain mathematical or table-based LBA translation after any scale out transformations. Although the example procedure is slightly more expensive due to the additional data remapping on the transformation path than traditional object based schemes, the regular data access path (e.g., using the updated address translation table(s) to translate logical addresses to physical addresses) is faster relative to other schemes.

Figure 6G:
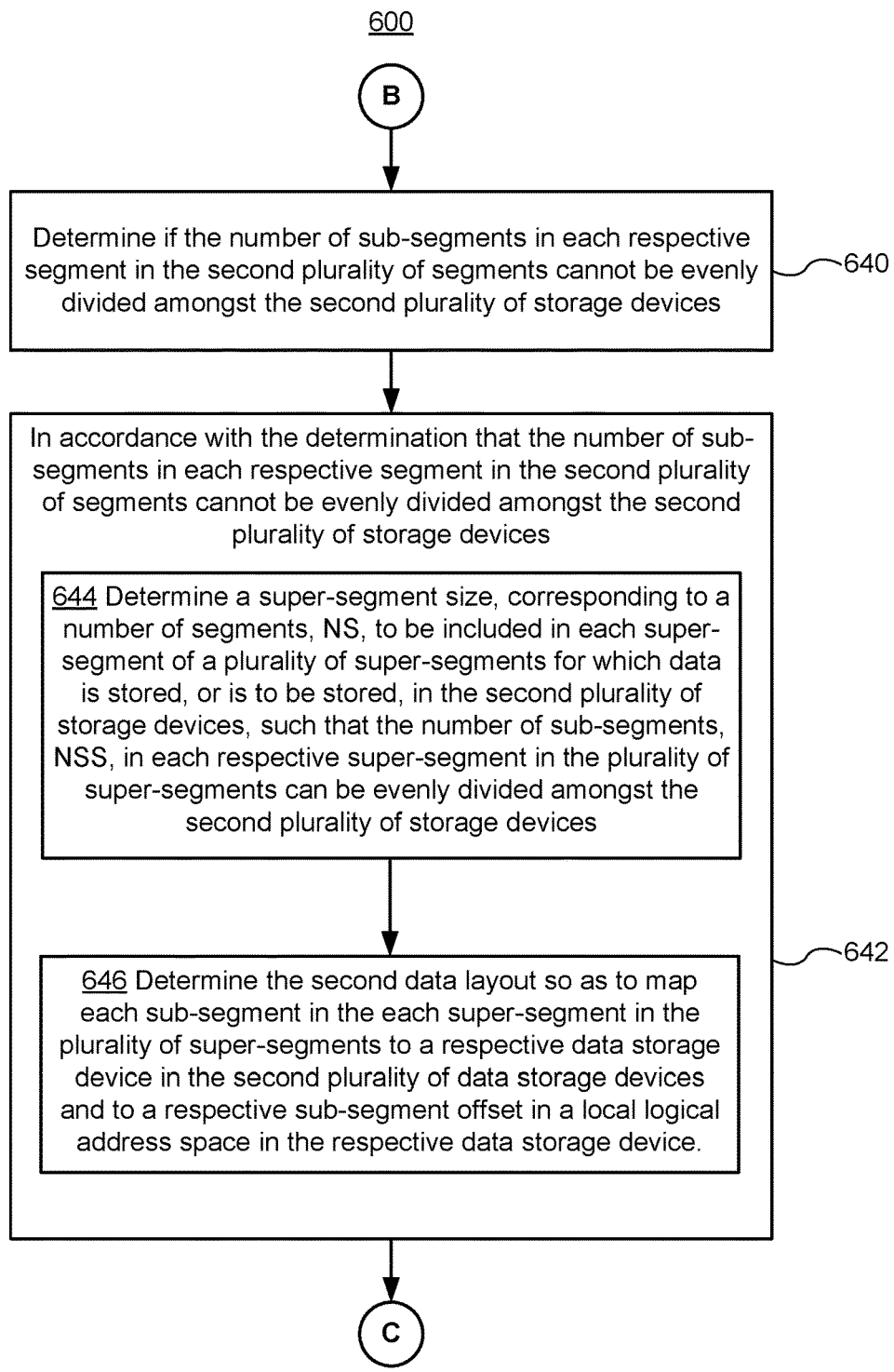
Figure 6H:
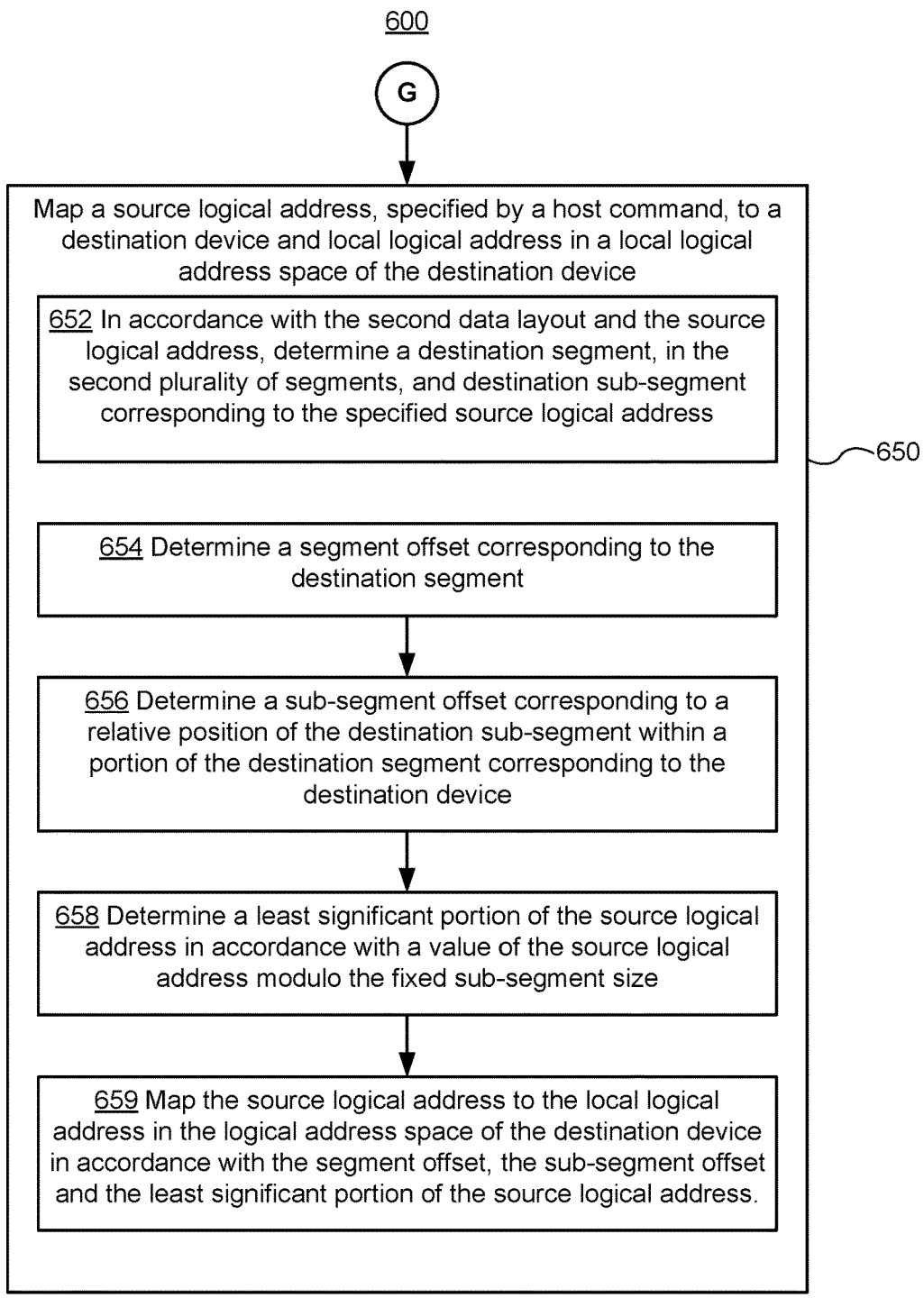

Referring to FIG. 6H, after the scale-out transformation process of FIGS. 6A-6F has been performed, a source logical address in the global logical address, such as an address provided in a host command from host devices, is mapped (650) into a local logical address in the logical address space of a destination storage device, using the second data layout that was used (or determined) during the scale-out transformation process. More particularly, mapping a source logical address specified by a host command to a destination device and local logical address in a logical address space of the destination device, includes:

in accordance with the second data layout and the source logical address, determining (652) a destination segment, in the second plurality of segments, and destination sub-segment corresponding to the specified source logical address (e.g., by dividing the source logical address by the segment size to produce a first quotient and determine the destination segment in accordance with the integer portion of the first quotient, and dividing the remainder (produced by the prior division) by the sub-segment size multiplied by the number of storage devices in the second plurality of storage devices to produce a second quotient and determine the destination sub-segment in accordance with the integer portion of the second quotient and the number of storage devices in the second plurality of storage devices);

determining (654) a segment offset corresponding to the destination segment (e.g., the integer portion of the first quotient);

determining (656) a sub-segment offset corresponding to a relative position of the destination sub-segment within a portion of the destination segment corresponding to the destination device (e.g., by determining the second quotient and the number of storage devices in the second plurality of storage devices, as described above with respect to 652, or by determining the number of rows of sub-segments in each segment, and then determining which row, in the rows of sub-segments in the destination segment corresponds to the specified source logical address);

determining (658) a least significant portion of the source logical address in accordance with a value of the source logical address modulo the fixed sub-segment size; and mapping (659) the source logical address to the local logical address in the logical address space of the destination device in accordance with the segment offset, the sub-segment offset and the least significant portion of the source logical address.

In some embodiments, host commands, which specify global logical addresses, are converted into local commands, specifying the corresponding local logical addresses (obtained using the methodology described above), and the local commands are directed to the destination device or devices corresponding to the received host commands.

In some embodiments, a different approach is used when segments cannot be evenly divided amongst the storage devices when new nodes are added to the system, a situation illustrated in FIG. 5C described above, so as to avoid unused segments (and thus unused space in the storage devices) in each of the segments of the second plurality of segments, after the scale-out transformation is completed. The controller system performs a sequence of operations (path 'B' in FIG. 6A) described here in reference to FIG. 6G, in accordance with some embodiments. As shown in FIG. 6G, the controller system first determines (640) if the number of sub-segments in each respective segment in the second plurality of segments cannot be evenly divided amongst the second plurality of storage devices. In accordance with the determination that the number of sub-segments in each respective segment in the second plurality of segments cannot be evenly divided amongst the second plurality of storage devices (642), the controller system determines (644), using a mapping module (e.g., logical address mapping module 240), a super-segment size, corresponding to a number of segments, NS, to be included in each super-segment of a plurality of super-segments for which data is stored, or is to be stored, in the second plurality of storage devices, such that the number of sub-segments, NSS, in each respective super-segment in the plurality of super-segments can be evenly divided amongst the second plurality of storage devices; and determines (646) the second data layout so as to map each sub-segment in the each super-segment in the plurality of super-segments to a respective storage device in the second plurality of data storage devices and to a respective sub-segment offset in a local logical address space in the respective storage device. Thus, the number of sub-segments in each super-segment in the plurality of super-segments is an integer multiple of the number of storage devices in the second plurality of storage devices. In some embodiments, a data layout function generator (e.g., generator 244) generates the second data layout, and stores the second data layout (e.g., as one of data layout functions 246) in memory (e.g., memory 206 of controller system 130. As already mentioned above, with reference to 609, in some embodiments, the second data layout is implemented using a table that maps each respective sub-segment in a source segment in the plurality of segments to a storage device and a sub-segment offset in a destination segment. However, in some embodiments in which super-segments are used, the second data layout is implemented using an array of tables, including one table for each segment of the NS segments in the super-segment, each table mapping the respective sub-segments in corresponding segment (of the NS segments in the super-segment) to a destination storage device and a sub-segment offset in a destination segment.

After the second data layout is determined, the controller system performs the data copying (e.g., 610, 612, 614), and local address map updating (e.g., 616) and local logical address compaction (e.g., 628, 630) processes or steps already described above, using the second data layout determined for the super-segments. In above description of those operations, for embodiments using super-segments, each occurrence of the term "segment" (but not each occurrence of the term "sub-segment") would be replaced by "super-segment", but otherwise the data copying and local address compaction portions of the scale-out transformation process remain the same as described above with reference to FIGS. 6A-6F.

In some embodiments, the scale-out processes described above are implemented, for instance, in a Linux Device Mapper (DM) driver.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of managing a data storage system having a first plurality of data storage devices, the method comprising:

at a controller system having one or more processors and a communications interface for communicatively coupling the controller system to storage devices in the data storage system:

for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in the first plurality of data storage devices to a respective storage device in the first plurality of data storage devices and to a respective sub-segment offset in a local logical address space in the respective storage device;

in response to adding one or more storage devices to the first plurality of data storage devices, thereby forming a second plurality of data storage devices:

determining a second data layout that maps each sub-segment of each segment in a second plurality of segments for which data is stored, or is to be stored, in the second plurality of data storage devices to a respective storage device in the second plurality of data storage devices and to a respective sub-segment offset in a local logical address space in the respective storage device, wherein the second plurality of segments includes the first plurality of segments and additional segments;

for one or more respective segments in the first plurality of segments:

for one or more respective sub-segments in the respective segment for which the second data layout maps the respective segment to a different storage device than the storage device to which the respective segment is mapped by the first data layout:

copying the respective sub-segment from a source storage device to which the respective segment is mapped by the first data layout to a destination storage device to which the respective sub-segment is mapped by the second data layout; and in the source storage device to which the respective segment is mapped by the first data layout, adding the local logical address range for the respective sub-segment to a free list for the source storage device; and in a source storage device, for which at least one respective sub-segment has been copied to a respective destination storage device, performing a logical address compaction operation by remapping one or more local logical address ranges in the source storage device to logical address ranges in the free list for the source storage device, without moving data corresponding to the remapped one or more logical address ranges; and determining if the number of sub-segments in each respective segment in the second plurality of segments cannot be evenly divided amongst the second plurality of data storage devices;

in accordance with the determination that the number of sub-segments in each respective segment in the second plurality of segments cannot be evenly divided amongst the second plurality of data storage devices:

determining a super-segment size, corresponding to a number of segments, NS, to be included in each super-segment of a plurality of super-segments for which data is stored, or is to be stored, in the second plurality of data storage devices, such that the number of sub-segments, NSS, in each respective super-segment in the plurality of super-segments can be evenly divided amongst the second plurality of data storage devices; and determining the second data layout so as to map each sub-segment in each respective super-segment in the plurality of super-segments to a respective storage device in the second plurality of data storage devices and to a respective sub-segment offset in a local logical address space in the respective storage device.

2. The method of claim 1, wherein remapping the one or more local logical address ranges comprises, in the source storage device, remapping the one or more local logical address ranges for one or more sub-segments in a segment other than the respective segment to logical address ranges in the free list for the source storage device.

3. The method of claim 1, wherein copying the respective sub-segment from a source storage device to which the respective segment is mapped by the first data layout to a destination storage device to which the respective segment is mapped by the second data layout includes:

calculating a segment offset of a destination segment based on a source logical block address, the number of blocks in a segment;

calculating a first sub-segment offset in the destination segment based on the offset of the destination segment, the number of blocks in a segment, and the number of blocks in a sub-segment;

using the second data layout, determining the destination storage device and a second sub-segment offset in the destination segment based on the first sub-segment offset; and copying the respective sub-segment from the source storage device to data storage portions of the destination storage device corresponding to the second sub-segment offset.

4. The method of claim 3, wherein copying the respective sub-segment from the source storage device to data storage portions of the destination storage device corresponding to the second sub-segment offset includes, for a respective block in the respect sub-segment:
   calculating a block offset for the respective block in the respective sub-segment based on a source logical block address for the respective block, the number of blocks in a segment, and the number of blocks in a sub-segment;
   calculating a destination logical block address for the respective block, in a local logical address space of the destination storage device, based on the block offset of the respective block in the respective sub-segment, the segment offset, the second sub-segment offset, the number of blocks in a segment, and the number of blocks in a sub-segment; and
   copying the respective block from the source storage device to data storage portions of the destination storage device identified by the destination logical block address for the respective block.

5. The method of claim 1, wherein the second data layout is implemented using a table that maps each respective sub-segment in a source segment in the plurality of segments to a storage device and a sub-segment offset in a destination segment.

6. The method of claim 1, further comprising mapping a source logical address specified by a host command to a destination device and local logical address in a logical address space of the destination device, said mapping including:
   in accordance with the second data layout and the source logical address, determining a destination segment, in the second plurality of segments, and destination sub-segment corresponding to the specified source logical address;
   determining a segment offset corresponding to the destination segment;
   determining a sub-segment offset corresponding to a relative position of the destination sub-segment within a portion of the destination segment corresponding to the destination device;
   determining a least significant portion of the source logical address in accordance with a value of the source logical address modulo the fixed sub-segment size; and
   mapping the source logical address to the local logical address in the logical address space of the destination device in accordance with the segment offset, the sub-segment offset and the least significant portion of the source logical address.

7. The method of claim 1, further comprising mapping a source logical address specified by a host command to a destination device and local logical address in a logical address space of the destination device, said mapping including: in accordance with the second data layout and the source logical address, determining a destination super-segment, in the plurality of super-segments, and a destination sub-segment corresponding to the specified source logical address; determining a super-segment offset corresponding to the destination super-segment; determining a sub-segment offset corresponding to a relative position of the destination sub-segment within a portion of the destination super-segment corresponding to the destination device; determining a least significant portion of the source logical address in accordance with a value of the source logical address modulo the fixed sub-segment size; and mapping the source logical address to the local logical address in the logical address space of the destination device in accordance with the super-segment offset, the sub-segment offset and the least significant portion of the source logical address.

8. The method of claim 7, wherein the source logical address is a logical block address in the global logical address space, and determining the least significant portion of the source logical address comprises determining a first value corresponding to the source logical address modulo the fixed sub-segment size, and determining a block offset corresponding to an integer portion of a second value determined by dividing the first value by a fixed block size.

9. The method of claim 1, wherein the controller system further comprises a host system external to the first plurality of data storage devices and the second plurality of data storage devices, the host system having a device mapper driver module for determining the first data layout and second data layout and for initiating or controlling performance of the sub-segment copying and the logical address compaction operation.

10. The method of claim 1, wherein the segments in the first and second pluralities of segments have a fixed segment size, the sub-segments in each of the segments have a fixed sub-segment size, and the blocks in each of the sub-segments have a fixed block size.

11. A method of managing a data storage system having a first plurality of data storage devices, the method comprising:
   at a controller system having one or more processors and a communications interface for communicatively coupling the controller system to storage devices in the data storage system:
      for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in the first plurality of data storage devices to a respective storage device in the first plurality of data storage devices and to a respective sub-segment offset in a local logical address space in the respective storage device;
      in response to adding one or more storage devices to the first plurality of data storage devices, thereby forming a second plurality of data storage devices:
         determining a second data layout that maps each sub-segment of each segment in a second plurality of segments for which data is stored, or is to be stored, in the second plurality of data storage devices to a respective storage device in the second plurality of data storage devices and to a respective sub-segment offset in a local logical address space in the respective storage device, wherein the second plurality of segments includes the first plurality of segments and additional segments;
         for one or more respective segments in the first plurality of segments:
            for one or more respective sub-segments in the respective segment for which the second data layout maps the respective segment to a different storage device than the storage device to which the respective segment is mapped by the first data layout:
copying the respective sub-segment from a source storage device to which the respective segment is mapped by the first data layout to a destination storage device to which the respective sub-segment is mapped by the second data layout; and
in the source storage device to which the respective segment is mapped by the first data layout, adding the local logical address range for the respective sub-segment to a free list for the source storage device; and
in a source storage device, for which at least one respective sub-segment has been copied to a respective destination storage device, performing a logical address compaction operation by remapping one or more local logical address ranges in the source storage device to logical address ranges in the free list for the source storage device, without moving data corresponding to the remapped one or more logical address ranges;
mapping a source logical address specified by a host command to a destination device and local logical address in a logical address space of the destination device, said mapping including:
in accordance with the second data layout and the source logical address, determining a destination segment, in the second plurality of segments, and destination sub-segment corresponding to the specified source logical address;
determining a segment offset corresponding to the destination segment;
determining a sub-segment offset corresponding to a relative position of the destination sub-segment within a portion of the destination segment corresponding to the destination device;
determining a least significant portion of the source logical address in accordance with a value of the source logical address modulo the fixed sub-segment size; and
mapping the source logical address to the local logical address in the logical address space of the destination device in accordance with the segment offset, the sub-segment offset and the least significant portion of the source logical address.

12. A memory controller, comprising:
a storage interface means for coupling the memory controller to a first plurality of data storage devices;
a communications interface means for communicatively coupling the memory controller to storage devices in the first plurality of data storage devices; and
a processing module means for processing addition of a storage device including:
for a global logical address space divided into a first plurality of segments, each segment further divided into a first plurality of sub-segments, each sub-segment further divided into a number of blocks, means for determining a first data layout that maps each sub-segment of each segment in the first plurality of segments for which data is stored, or is to be stored, in the first plurality of storage devices to a respective storage device in the first plurality of storage devices and to a respective sub-segment offset in a local logical address space in the respective storage device;
in response to adding one or more storage devices to the first plurality of storage devices, means for thereby forming a second plurality of storage devices:
means for determining a second data layout that maps each sub-segment of each segment in a second plurality of segments for which data is stored, or is to be stored, in the second plurality of storage devices to a respective storage device in the second plurality of storage devices and to a respective sub-segment offset in a local logical address space in the respective storage device, wherein the second plurality of segments includes the first plurality of segments and additional segments;
for one or more respective segments in the first plurality of segments:
for one or more respective sub-segments in the respective segment for which the second data layout maps the respective segment to a different storage device than the storage device to which the respective segment is mapped by the first data layout:
means for copying the respective sub-segment from a source storage device to which the respective segment is mapped by the first data layout to a destination storage device to which the respective sub-segment is mapped by the second data layout; and
in the source storage device to which the respective segment is mapped by the first data layout, means for adding the local logical address range for the respective sub-segment to a free list for the source storage device; and
in a source storage device, for which at least one respective sub-segment has been copied to a respective destination storage device, means for performing a logical address compaction operation by remapping one or more local logical address ranges in the source storage device to logical address ranges in the free list for the source storage device, without moving data corresponding to the remapped one or more logical address ranges;
means for determining if the number of sub-segments in each respective segment in the second plurality of segments cannot be evenly divided amongst the second plurality of data storage devices, and in accordance with the determination that the number of sub-segments in each respective segment in the second plurality of segments cannot be evenly divided amongst the second plurality of data storage devices:
determining a super-segment size, corresponding to a number of segments, NS, to be included in each super-segment of a plurality of super-segments for which data is stored, or is to be stored, in the second plurality of data storage devices, such that the number of sub-segments, NSS, in each respective super-segment in the plurality of super-segments can be evenly divided amongst the second plurality of data storage devices; and
means for determining the second data layout so as to map each sub-segment in each respective super-segment in the plurality of super-segments to a respective storage device in the second plurality of data storage devices and to a respective sub-segment offset in a local logical address space in the respective storage device.

13. The memory controller of claim 12, wherein remapping the one or more local logical address ranges comprises, in the source storage device, remapping the one or more local logical address ranges for one or more sub-segments in a segment other than the respective segment to logical address ranges in the free list for the source storage device.

14. The memory controller of claim 12, wherein copying the respective sub-segment from a source storage device to which the respective segment is mapped by the first data layout to a destination storage device to which the respective segment is mapped by the second data layout includes:
   calculating a segment offset of a destination segment based on a source logical block address, the number of blocks in a segment;
   calculating a first sub-segment offset in the destination segment based on the offset of the destination segment, the number of blocks in a segment, and the number of blocks in a sub-segment;
   using the second data layout, determining the destination storage device and a second sub-segment offset in the destination segment based on the first sub-segment offset; and
   copying the respective sub-segment from the source storage device to data storage portions of the destination storage device corresponding to the second sub-segment offset.

15. The memory controller of claim 14, wherein copying the respective sub-segment from the source storage device to data storage portions of the destination storage device corresponding to the second sub-segment offset includes, for a respective block in the respect sub-segment:
   calculating a block offset for the respective block in the respective sub-segment based on a source logical block address for the respective block, the number of blocks in a segment, and the number of blocks in a sub-segment;
   calculating a destination logical block address for the respective block, in a local logical address space of the destination storage device, based on the block offset of the respective block in the respective sub-segment, the segment offset, the second sub-segment offset, the number of blocks in a segment, and the number of blocks in a sub-segment; and
   copying the respective block from the source storage device to data storage portions of the destination storage device identified by the destination logical block address for the respective block.

16. The memory controller of claim 12, wherein the second data layout is implemented using a table that maps each respective sub-segment in a source segment in the plurality of segments to a storage device and a sub-segment offset in a destination segment.

17. The memory controller of claim 12, wherein the memory controller comprises a host system external to the first plurality of storage devices and the second plurality of storage devices, the host system having a device mapper driver module for determining the first data layout and second data layout and for initiating or controlling performance of the sub-segment copying and the logical address compaction operation.

18. A non-transitory computer readable storage medium storing one or more programs configured for execution by a memory controller configured to be coupled to a plurality of data storage devices in a data storage system, the one or more programs comprising instructions that when executed by one or more processors of the memory controller, cause the memory controller to:
   for a global logical address space divided into a first plurality of segments, each segment further divided into a first plurality of sub-segments, each sub-segment further divided into a number of blocks, determining a first data layout that maps each sub-segment of each segment in the first plurality of segments for which data is stored, or is to be stored, in a first plurality of storage devices to a respective storage device in the first plurality of storage devices and to a respective sub-segment offset in a local logical address space in the respective storage device;
   in response to adding one or more storage devices to the first plurality of storage devices, thereby forming a second plurality of storage devices:
      determining a second data layout that maps each sub-segment of each segment in a second plurality of segments for which data is stored, or is to be stored, in the second plurality of storage devices to a respective storage device in the second plurality of storage devices and to a respective sub-segment offset in a local logical address space in the respective storage device, wherein the second plurality of segments includes the first plurality of segments and additional segments;
      for one or more respective segments in the first plurality of segments:
         for one or more respective sub-segments in the respective segment for which the second data layout maps the respective segment to a different storage device than the storage device to which the respective segment is mapped by the first data layout:
            copying the respective sub-segment from a source storage device to which the respective segment is mapped by the first data layout to a destination storage device to which the respective sub-segment is mapped by the second data layout; and
            in the source storage device to which the respective segment is mapped by the first data layout, adding the local logical address range for the respective sub-segment to a free list for the source storage device; and
         in a source storage device, for which at least one respective sub-segment has been copied to a respective destination storage device, performing a logical address compaction operation by remapping one or more local logical address ranges in the source storage device to logical address ranges in the free list for the source storage device, without moving data corresponding to the remapped one or more logical address ranges;
      determining if the number of sub-segments in each respective segment in the second plurality of segments cannot be evenly divided amongst the second plurality of data storage devices;
      in accordance with the determination that the number of sub-segments in each respective segment in the second plurality of segments cannot be evenly divided amongst the second plurality of data storage devices:

determining a super-segment size, corresponding to a number of segments, NS, to be included in each super-segment of a plurality of super-segments for which data is stored, or is to be stored, in the second plurality of data storage devices, such that the number of sub-segments, NSS, in each respective super-segment in the plurality of super-segments can be evenly divided amongst the second plurality of data storage devices; and determining the second data layout so as to map each sub-segment in each respective super-segment in the plurality of super-segments to a respective storage device in the second plurality of data storage devices and to a respective sub-segment offset in a local logical address space in the respective storage device.

19. The non-transitory computer readable storage medium of claim 18, wherein the memory controller comprises a host system external to the first plurality of storage devices and the second plurality of storage devices, the host system having a device mapper driver module for determining the first data layout and second data layout and for initiating or controlling performance of the sub-segment copying and the logical address compaction operation.

* * * * *